Nov. 25, 1941.  D. P. SANFORD  2,263,891
SHEET FEEDER
Filed March 14, 1940  10 Sheets-Sheet 4
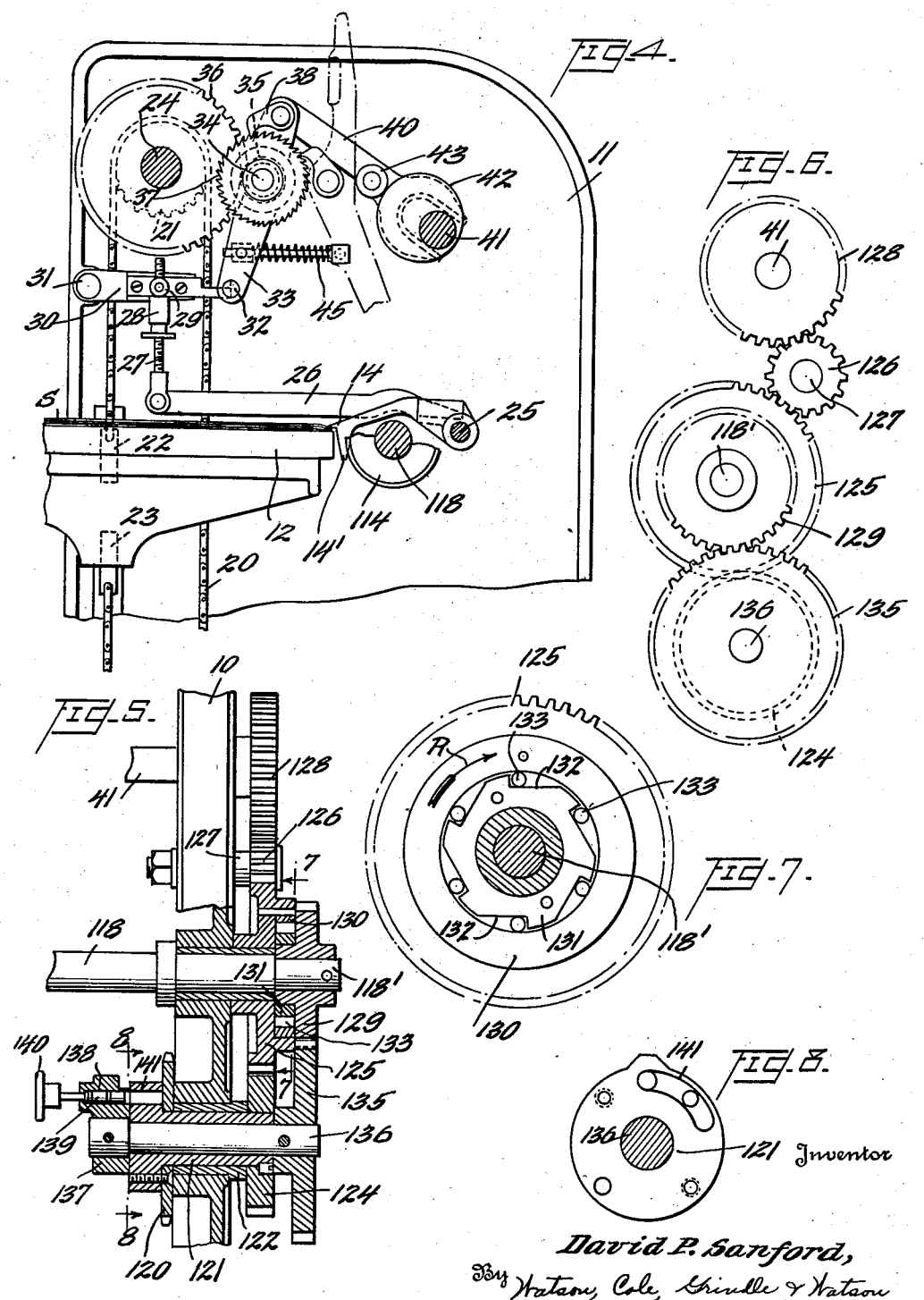

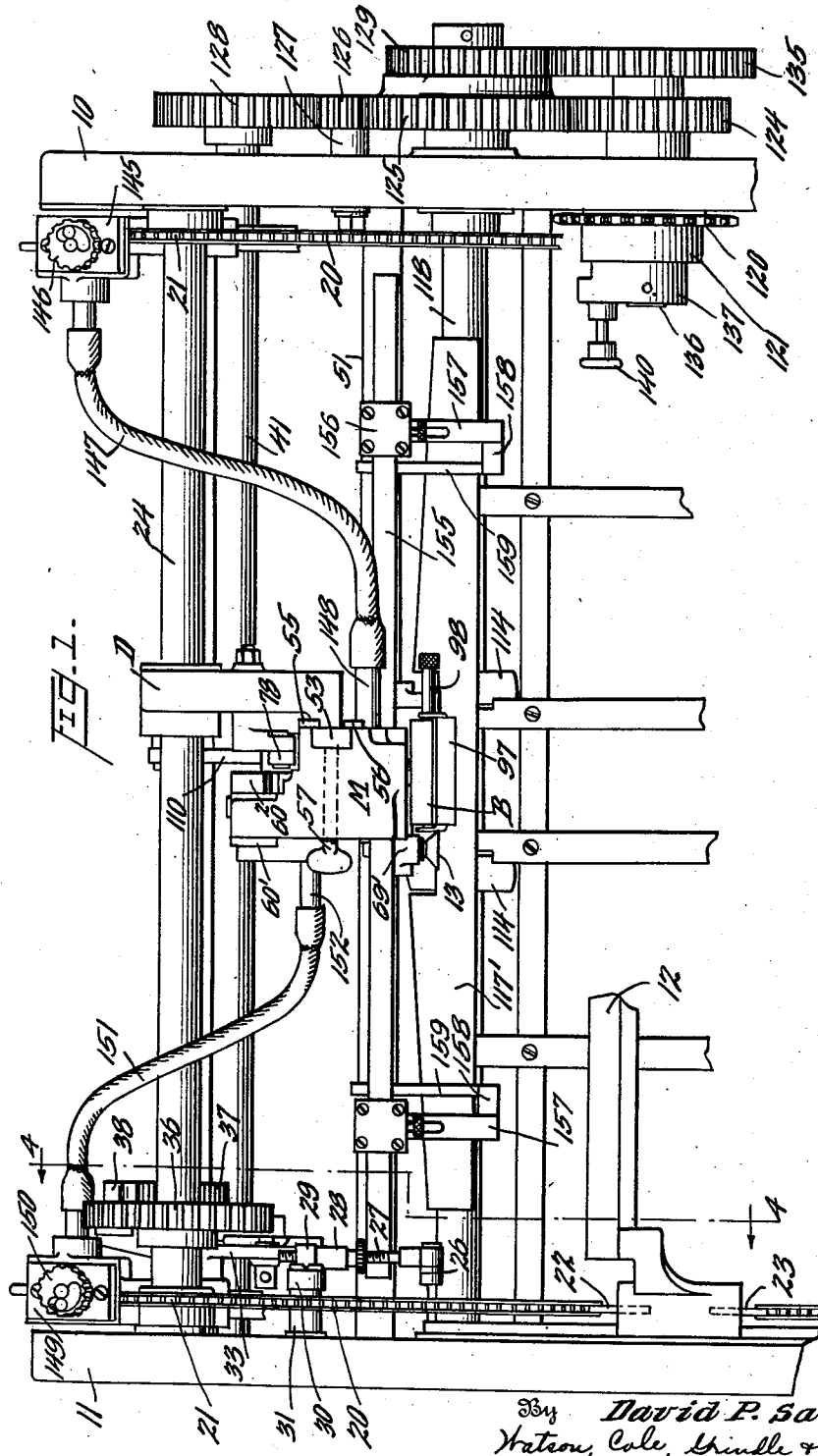

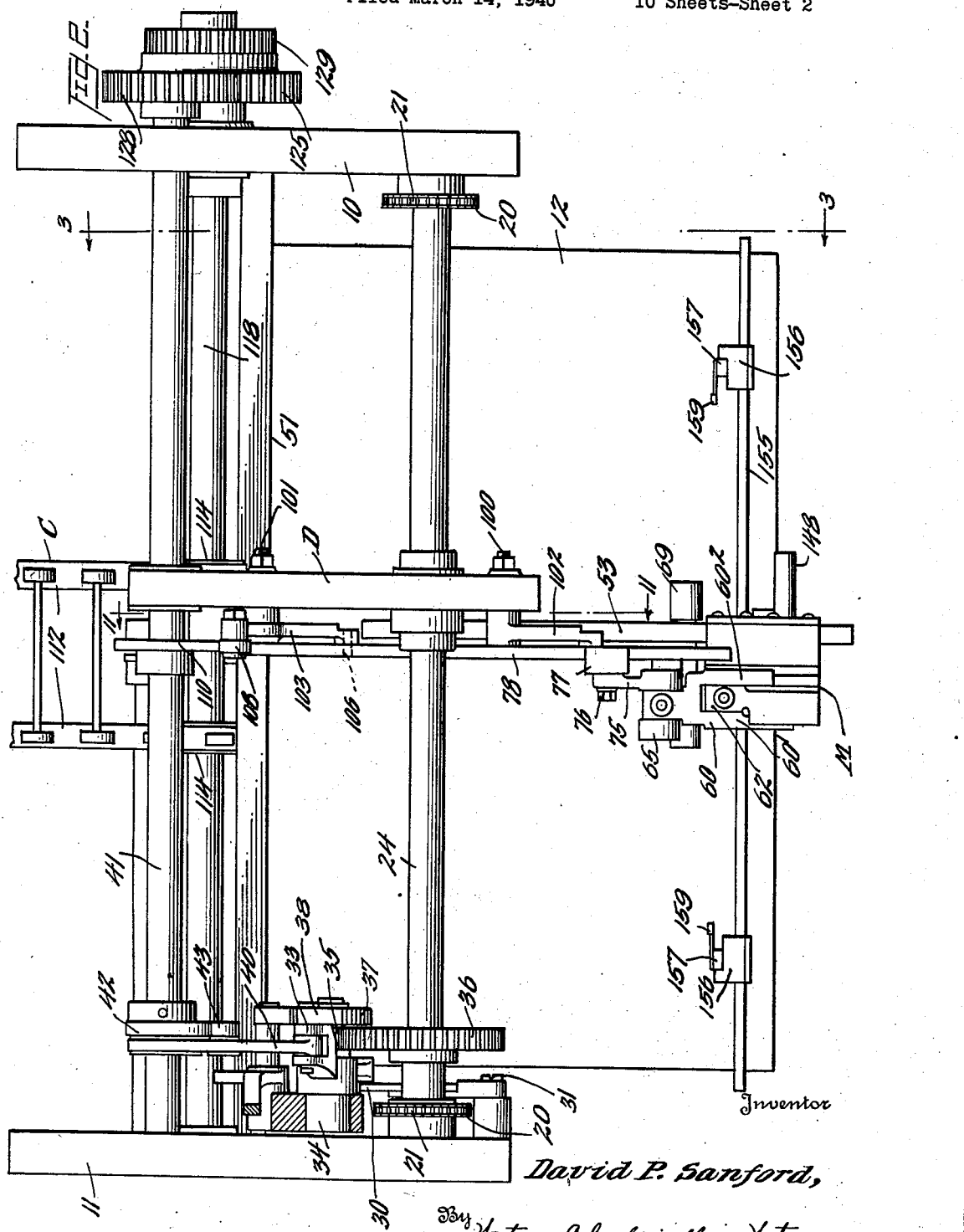

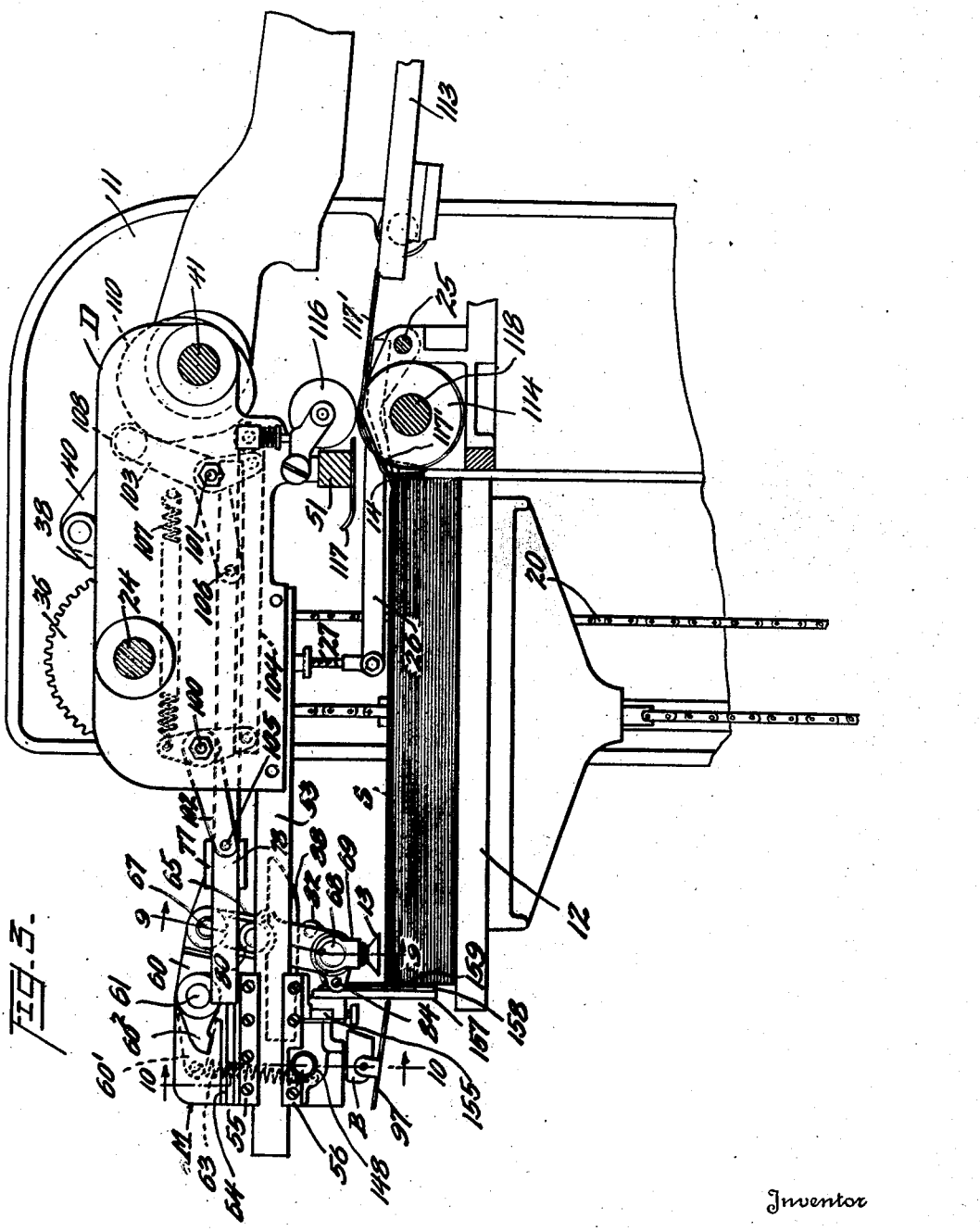

Nov. 25, 1941.   D. P. SANFORD   2,263,891
SHEET FEEDER
Filed March 14, 1940   10 Sheets-Sheet 5
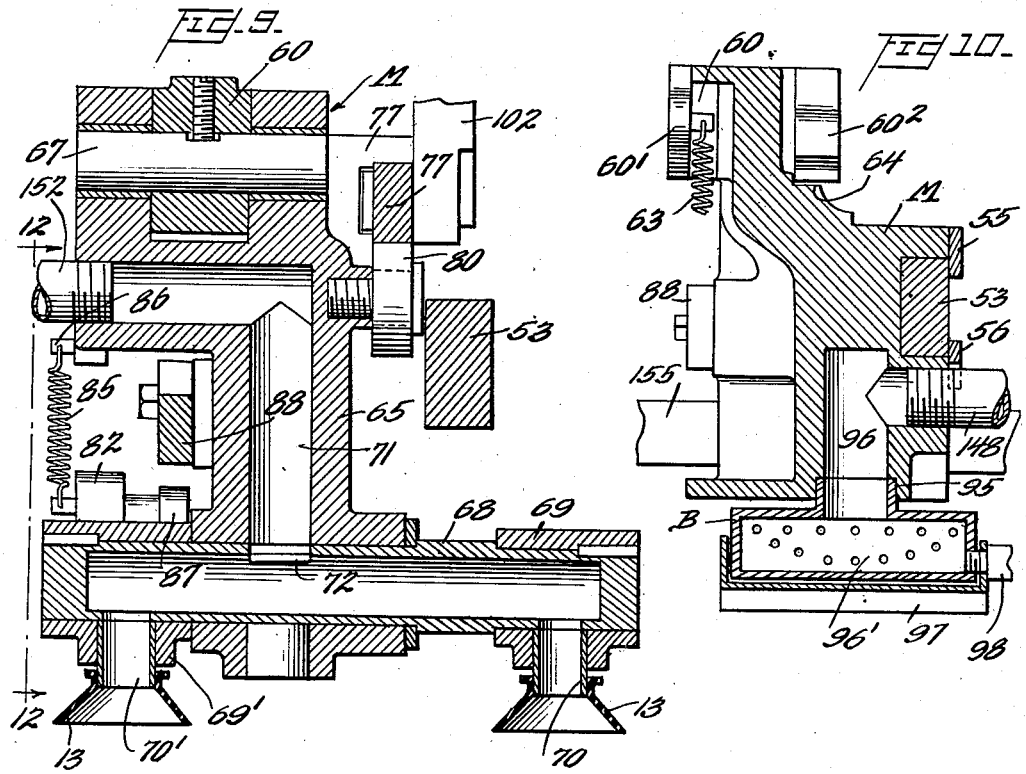
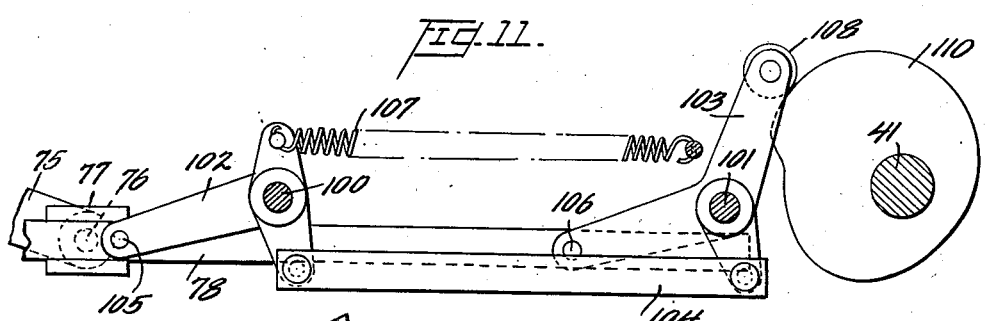
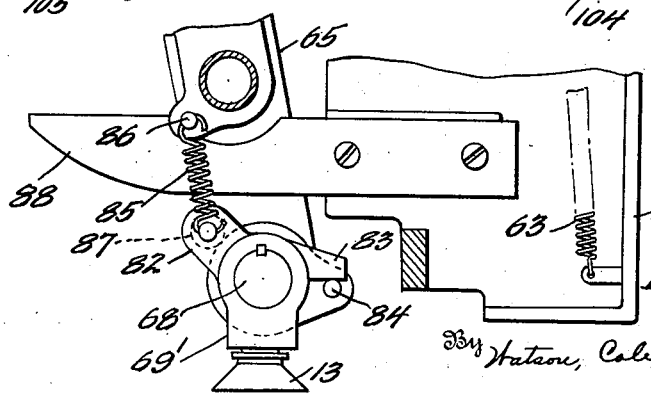
Inventor
David P. Sanford,
By Watson, Cole, Grindle & Watson
Attorney

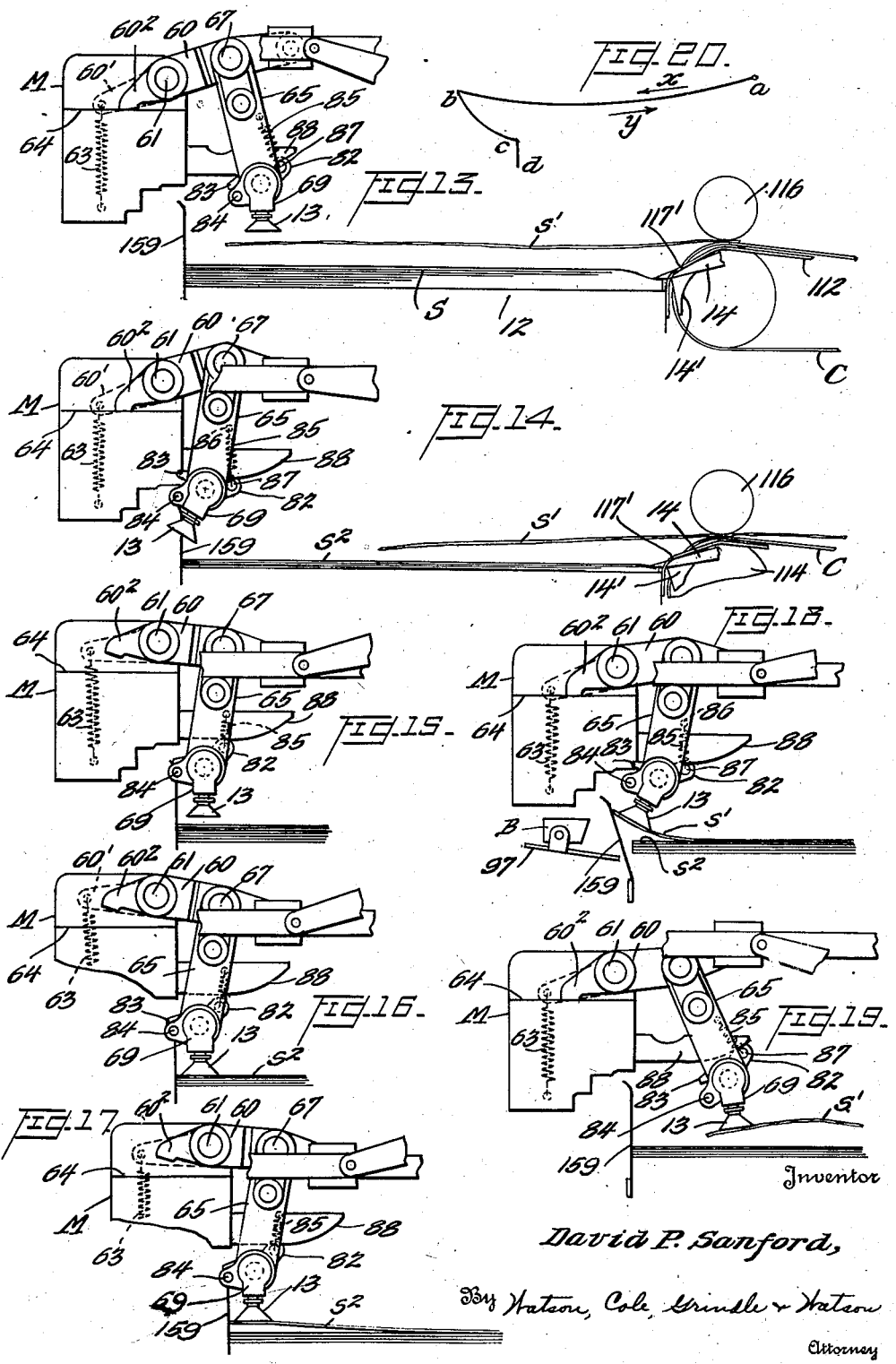

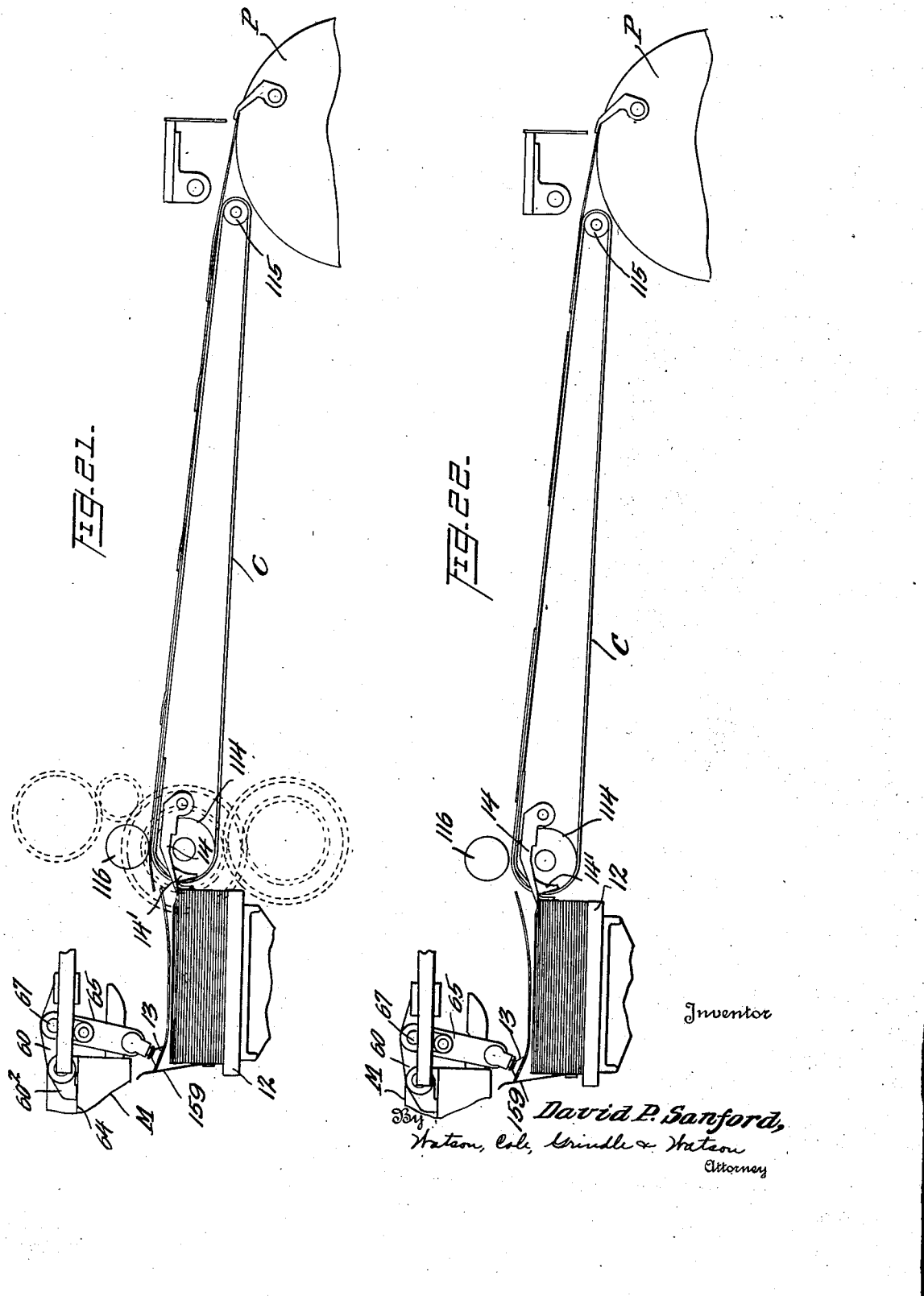

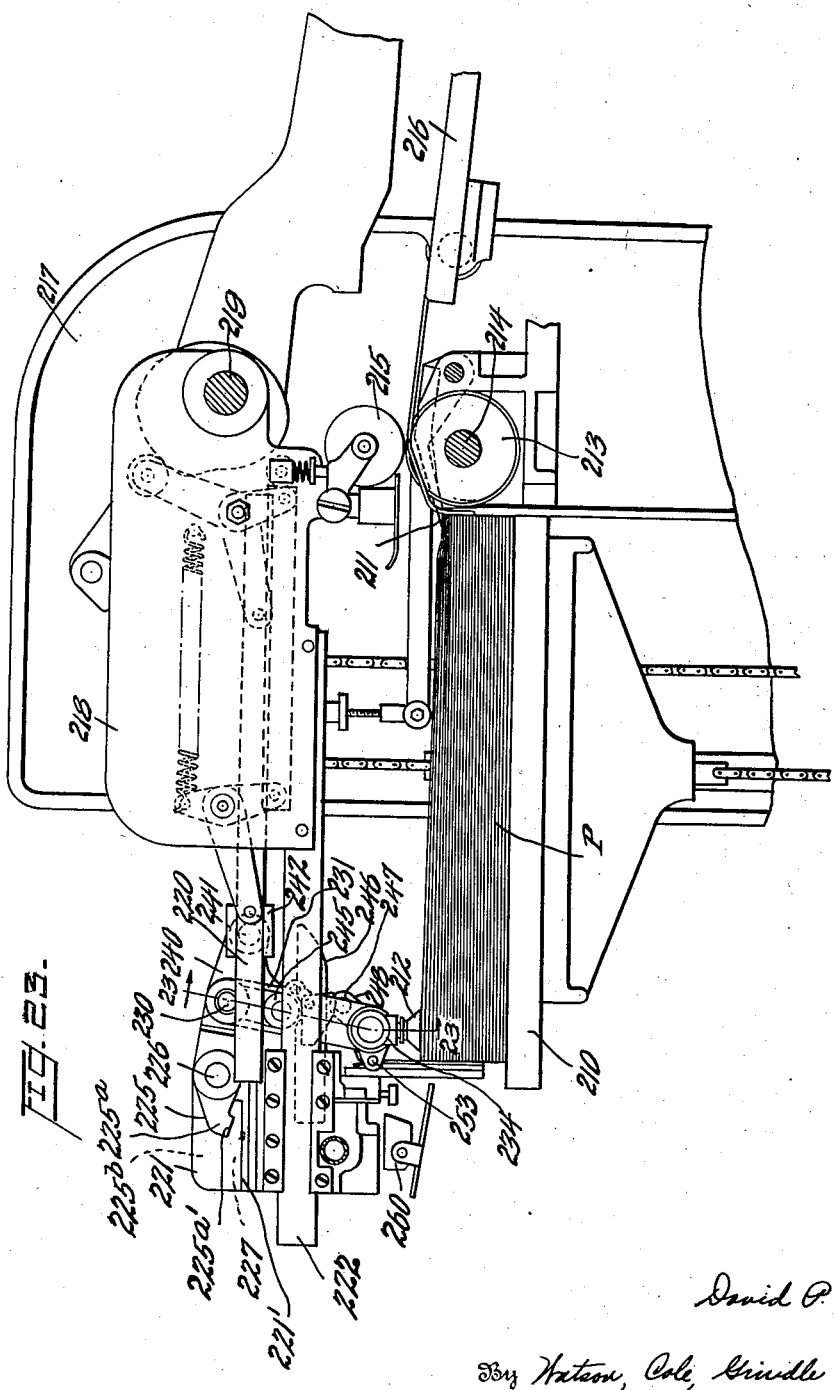

Nov. 25, 1941.  D. P. SANFORD  2,263,891
SHEET FEEDER
Filed March 14, 1940  10 Sheets-Sheet 9
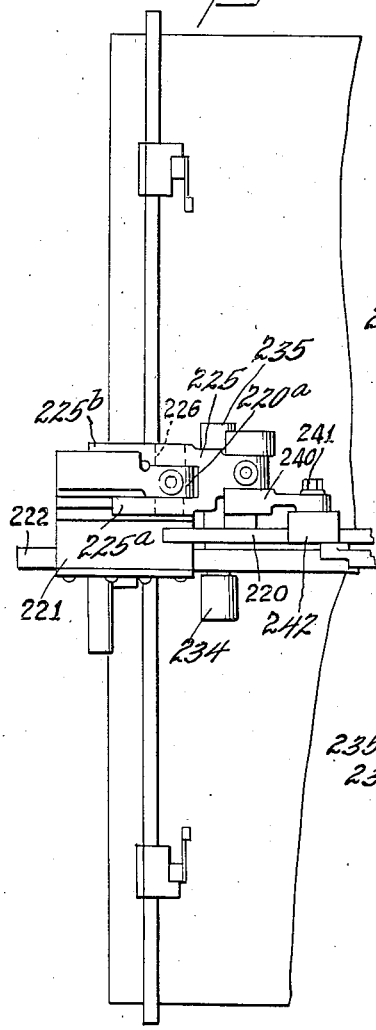
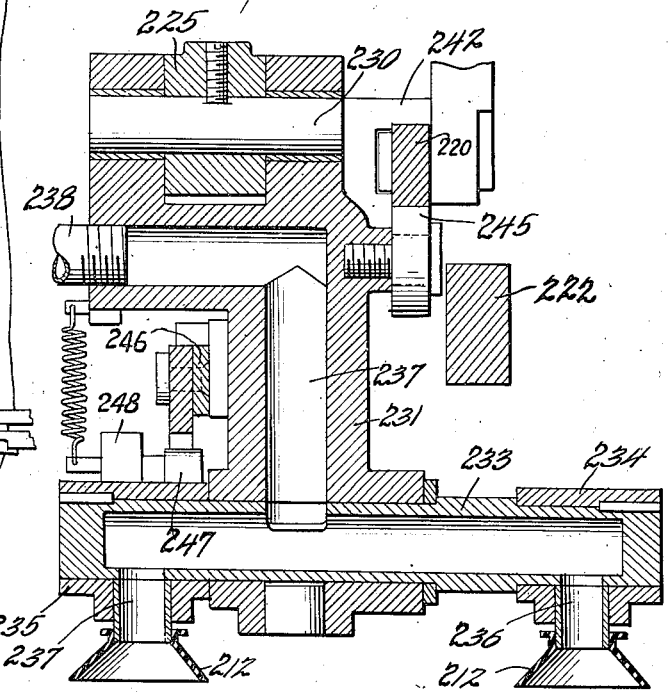
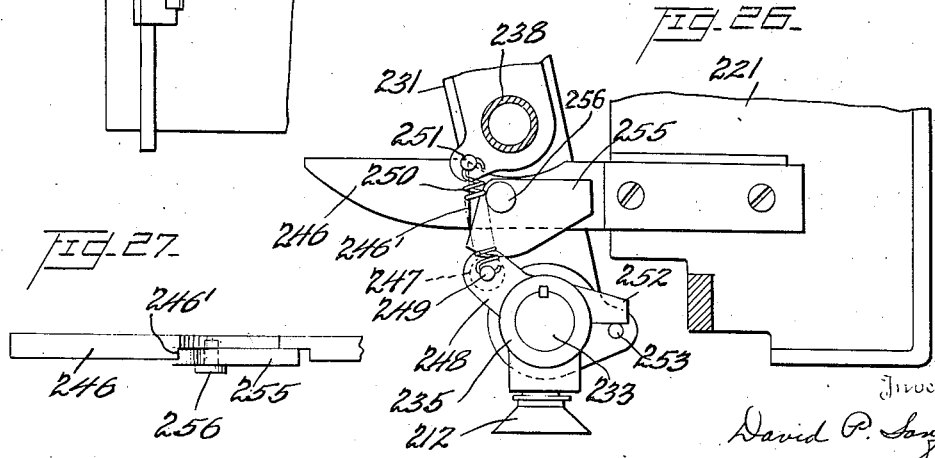
Inventor
David P. Sanford
By Watson, Cole, Grindle & Watson
Attorney Nov. 25, 1941.  D. P. SANFORD  2,263,891
SHEET FEEDER
Filed March 14, 1940  10 Sheets-Sheet 10
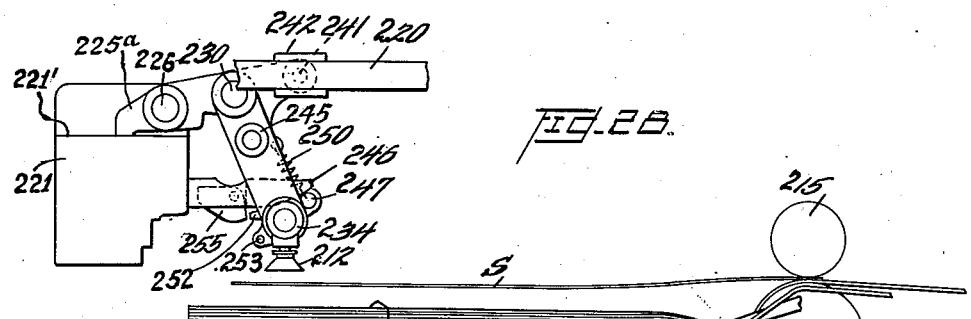
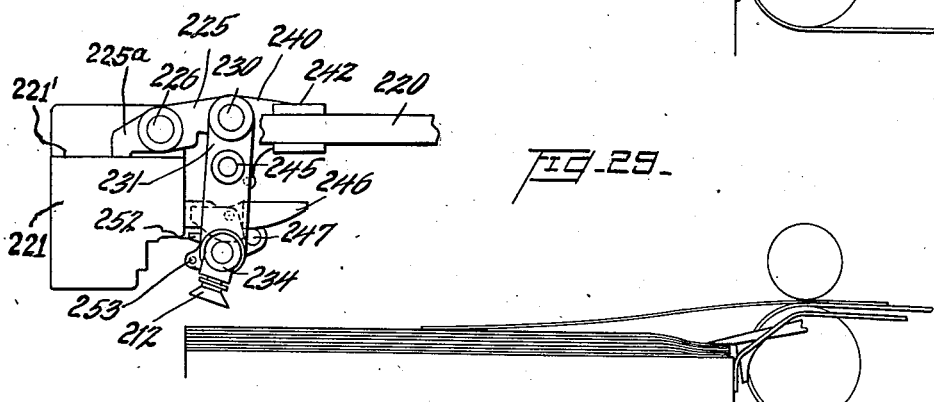
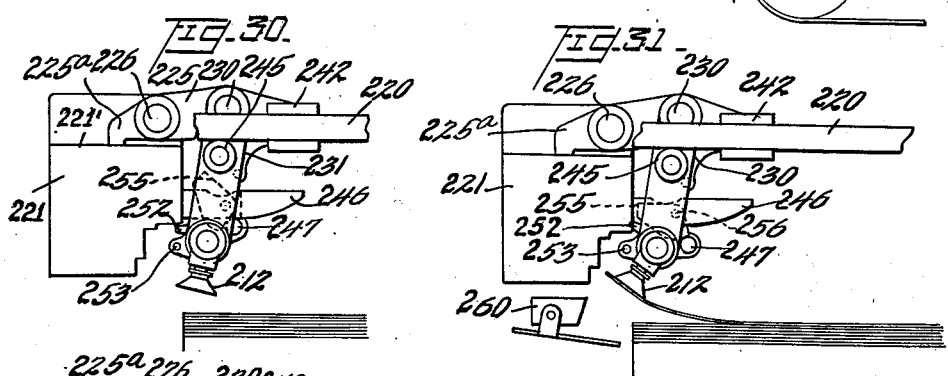
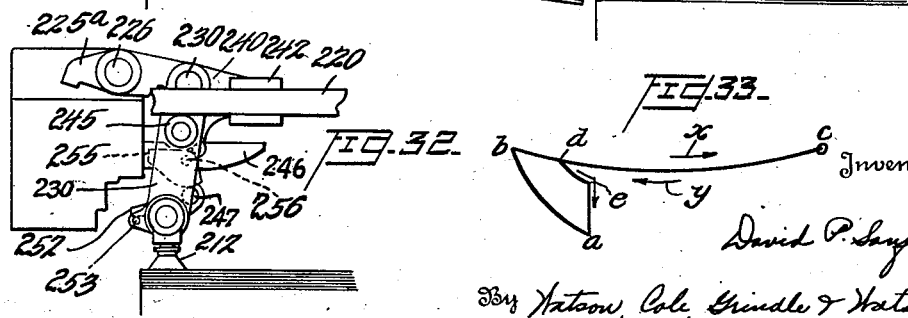
Inventor
David P. Sanford
By Watson, Cole, Grindle & Watson
Attorney Patented Nov. 25, 1941

2,263,891

UNITED STATES PATENT OFFICE 2,263,891

SHEET FEEDER

David P. Sanford, Elizabeth, N. J., assignor to American Type Founders, Inc., Elizabeth, N. J., a corporation of New Jersey Application March 14, 1940, Serial No. 323,995

37 Claims. (Cl. 271—27)

The present invention relates to sheet feeding mechanisms and particularly to sheet feeding mechanisms of the type employed in feeding individual sheets from piles of such sheets to printing presses and/or folding, slitting, glueing, wrapping, and similar machines.

This application is a continuation-in-part of my copending applications, Serial No. 232,443, filed September 29, 1938, and Serial No. 258,306, filed February 24, 1939.

The general purpose of the invention is to provide a sheet feeding mechanism which may be operated at a high speed without loss of accuracy or full control over the sheets being fed and which is likewise adapted to feed sheets which vary in size, thickness, and quality, with equal facility. A characteristic of the improved sheet feeder is its simplicity, which not only renders it readily understandable to operators but permits it to be manufactured at low cost and maintained in service for long periods of time at small expense. It is designed and constructed so as to be readily adjustable to feed sheets singly and in spaced relation or to feed sheets in overlapping relationship, this last method of feeding being commonly designated "stream feeding."

It has heretofore been suggested that in the feeding of sheets singly from a pile to a mechanism such as a printing press, it is highly advantageous to provide as one element of the feeding mechanism a member, which may be designated a hold-down member, and the function of which is to continuously maintain a relatively light pressure upon the top of the pile, or at least during the entire period of time in which any second device, such as a sheet gripper, is acting upon the uppermost sheet, or during the time that an air blast is directed against the edges of the uppermost sheets. This holding-down member tends to prevent disturbance or displacement of the sheets immediately below the uppermost sheet which is being removed and prevents lateral displacement of such sheets.

It has likewise heretofore been suggested that there be used, in association with a holding-down member of the type just referred to, a sheet withdrawing element provided with a sheet engaging portion or gripper and by means of which the uppermost sheet of the pile may be engaged and moved bodily in a horizontal plane so as to completely disengage the holding-down member. One form of such sheet withdrawing device which has been very widely used comprises a rotatable element or wheel provided with suction means, the wheel being revoluble about a horizontal axis above the pile in such manner that the uppermost sheet of the pile may be engaged and caused to adhere to its periphery by reason of the suction created, rotation of the wheel frictionally moving the sheet laterally and withdrawing it beneath the hold-down member.

The combination of holding-down member and means for withdrawing sheets singly from beneath the same, however, has heretofore been employed only in sheet feeding mechanisms of the type adapted for the feeding of sheets serially to a press or to a conveyor, by "serial" feeding being meant the feeding of sheets in spaced relationship, as distinguished from overlapping relationship. This is by reason of the fact that each sheet gripping and forwarding means heretofore proposed and used has been so positioned with relation to the holding-down member and the other essential elements of the sheet feeding mechanism that gripping of each successive sheet at its forward or leading edge has alone been possible. With such arrangement feeding of sheets forwardly, in overlapping relationship, by means of a conveyor, to a printing press, has not been practiced, the sheet gripping and forwarding means being so positioned as to interfere with the placement of successive sheets upon the conveyor in such relationship.

In accordance with the present invention it is possible to retain the highly advantageous features of sheet feeding mechanisms of the type above generally described, i. e., to retain the holding-down member and the means for withdrawing sheets laterally from beneath this member, which combination of means has been so successfully employed in feeding sheets singly while at the same time, by redesigning these principal elements, rearranging them with relation to the conveying means, and associating with them certain additional elements, it has been made possible to feed sheets in overlapping relationship, commonly called in the art, "stream feeding."

The advantages of stream feeding are well-known and need not be enlarged upon. Principally stream feeding is resorted to in order to permit more rapid sheet feeding while maintaining perfect registration of the successively advanced sheets at the impression cylinder of the press or at the end of the conveyor in the case of a folding machine or the like. The number of sheets on the conveyor intermediate the sheet separating and feeding means and the mechanism which is to ultimately receive these sheets is increased as compared with the number of sheets so located in serial feeding, while at the same time synchronous action of the sheet separating and forwarding means, and the sheet withdrawing means is maintained, one sheet being withdrawn by the last mentioned means for each sheet fed by the first mentioned means.

While the present invention in its broadest aspect is not limited to any precise relative arrangement of holding-down member, sheet withdrawing means, and sheet forwarding means, and contemplates any suitable relative arrangement of these various parts with respect to each other and to the sheet receiving conveyor, nevertheless it is of great practical advantage to so position the holding-down member that it engages the forward margin of the uppermost sheet of the pile, that is, engages that margin of the uppermost sheet which may be termed the leading edge inasmuch as it first enters the conveyor provided to conduct it to the printing mechanism or the like. Likewise it is desirable, from a practical standpoint, to position the sheet withdrawing mechanism, i. e., the mechanism for withdrawing sheets singly from beneath the holding-down member, so that it overlies and acts upon the rear edge of the sheet to be moved, i. e., that edge of the sheet which last enters the conveyor mechanism. Advantageously the sheet withdrawing mechanism may be combined with the sheet forwarding mechanism, thus making it possible for a single sheet engaging and gripping element to be employed for the dual purpose of removing the sheet from beneath the holding-down member and thereafter forwarding it, or initiating its forward movement, toward the conveyor. With such arrangement maximum simplicity of construction is realized while at the same time the feeding of sheets either in overlapping or stream relationship, or serial relationship, through the conveyor, may be readily practiced. Besides enhancing the speed and facility with which the sheets are fed, this feature makes for economy of space, materials, and expense in construction and maintenance, since no other feeding or forwarding device need be employed save the optionally usable and broadly conventional tape or roller conveyor and the air blast equipment. Even when these auxiliary devices are employed, the unitary sheet separating and feeding device is the only means for this purpose disposed above the pile.

A further feature of the invention consists in the arranging of the various component elements of the sheet withdrawing and forwarding mechanism, together with the driving or actuating means therefor, in such manner that this mechanism may be freely adjusted with respect to the sheet pile supporting means and the conveyor and the feeding of sheets of various dimensions made possible without the necessity of dismantling any portion of the apparatus for the purpose of effecting such adjustment. In effect the driving connection between the source of power and the mechanism for actuating the sheet gripping element is of flexible nature permitting ready adjustment of the machine by an unskilled operator for the purpose of feeding sheets which vary widely in width and length. Such adjustment can be effected at any time and quite regardless of the relative positions of the movable parts of the mechanism in their several cycles of movement, and without the aid of complicated auxiliary mechanisms for facilitating such adjustment. The improved mechanism accomplishes the feeding of sheets, for instance to the impression cylinder of a press, either in stream formation or serially and without the aid of sheet holding devices or presser feet of the type which alternately engage and disengage the pile.

The sheet feeding mechanism includes in addition to the sheet pulling and forwarding means, a conveyor and means for driving the conveyor at a speed which may be rendered higher or lower by the operator in order to obtain stream or serial sheet feeding. The conveyor driving mechanism is likewise of such character that it may be, with but a simple change in dimension of certain parts, made use of primarily for the purpose of varying the extent of overlap of sheets moving in stream formation. Likewise the conveyor driving means may be so designed that it is easily possible to so regulate the movement of sheets from the sheet withdrawing and forwarding means to the impression cylinder of the press that the printing method commonly designated "double rolling" in the art may be practiced. This method comprises essentially reducing the number of sheets fed by one half while maintaining the speed of the press unchanged, the natural result being that the impression cylinder revolves four times (in the case of a two-revolution press) around its axis for each printing operation, instead of twice only, thus making it possible for the inking mechanism to more evenly distribute ink over the surface of the form to be printed, before the printing operation takes place.

The mechanism for actually engaging and gripping sheets, withdrawing them from under the holding-down member, and forwarding them to the conveyor is in itself of novel character. It includes means for manipulating a sheet gripping element, preferably a sheet gripping element of the suction type, along a closed and pre-determined path, this means being so designed that the sheet gripping element, as it moves toward the uppermost sheet of the pile, preferably passes downwardly substantially vertically or normally to the sheet, thus having no tendency when approaching the sheet to move it laterally.

In one of the illustrated embodiments of the invention, the sheet gripping element is first caused to move downwardly into engagement with the sheet, thence upwardly, carrying the rear edge of the sheet with it, then along an arcuate path upwardly and rearwardly, thus further elevating the sheet and retracting the sheet bodily, and then forwardly to move the forward edge of the sheet into the bite of a conveyor by means of which it is rapidly withdrawn from the vicinity of the pile, the suction gripper releasing the rear edge of the sheet at about the time that its forward edge engages and is gripped by the conveyor.

In accordance with another exemplary embodiment a similar suction gripper is employed and likewise novel means for moving this suction gripper along a predetermined path above the rear margin of the uppermost sheet of a pile of sheets. The path followed by this gripper in separating the rear edge of the sheet from a pile, retracting it and then feeding it forwardly to a conveyor, is, broadly speaking, somewhat similar to the path which is followed by the gripper described above but in order that the rearward movement of the uppermost sheet shall commence simultaneously with the beginning of the upward movement of the rear edge of the sheet, the gripper actuating mechanism is modified so that the rear edge of the sheet is moved along an arcuate path upwardly and rearwardly instead of being moved first upwardly and then upwardly and rearwardly, the purpose being to bring about a smoother retraction of the forward edge of the sheet from beneath the holding-down device which overlies the forward margin of the pile. The gripper operating mechanism is so designed, however, that notwithstanding the fact that it moves simultaneously upwardly and rearwardly away from the pile, it will move substantially vertically downwardly as it approaches the pile in order that the suction gripper may make a fair contact with the uppermost sheet. In order that this cycle of movements may be carried out, this gripper actuating means includes a control part which is active to cause the gripper to pursue the said arcuate path on being elevated but which part may be readily deflected upon the return movement of the suction gripper and hence comprises no obstacle during such movement to the vertical downward movement of the suction element upon the sheet. By this arrangement the suction gripping element is caused to more smoothly withdraw sheets from the pile, while at the same time the advantageous vertical downward motion of the gripper toward the pile is maintained. The invention may be embodied in various forms and types of sheet feeding mechanisms, as will be apparent to one skilled in the art.

Various features of the mechanism for actuating the sheet gripping element in its cycle of movements may be employed generally in connection with sheet feeding mechanisms, for instance in connection with a sheet gripping mechanism so designed and so positioned that it is adapted to engage the leading or forward edges of sheets to be fed instead of the rear or trailing edges of such sheets.

Numerous additional novel features of the invention will be hereinafter described in detail. It might be here added, however, that the invention contemplates a novel means, movable with the sheet gripping mechanism, for resiliently engaging the rear edges of the uppermost sheets of a pile of sheets which means not only serves as an aid to the operator in locating such mechanism with respect to the pile but also maintains the uppermost sheets of the pile in precise superposed relationship. Such means likewise cooperates with the sheet gripping, retracting and forwarding means in effecting sheet separation, particularly when the sheets of the pile are light in weight and of porous nature and thus more easily fed two or more at a time instead of singly.

The actual separation of the uppermost sheet of the pile from the underlying sheets is facilitated by the application of a continuous blast of air against the rear edges of a number of the uppermost sheets, it being the purpose of the blast to separate or "fluff up" the several uppermost sheets and to somewhat raise the top sheet toward the suction gripper and to place this sheet in such position that it may be readily engaged by the gripper as it descends. The action of the air blast is not neutralized or offset in any manner, the rear margins of the sheets being entirely free to rise under its influence, the mechanism including no member or means which acts downwardly or exerts pressure on the pile adjacent its rear margin. The elimination of such pile engaging or pressure members acting upon the rear edge of the pile makes it unnecessary to accurately set the height control gauge, the sheets being blown upwardly to such an extent that the suction gripper may become active and effective in every instance, despite minor variations in the distance between the bottom of the suction gripper and the top of the solid pile, when the suction gripper is in its lowest position. This is an important advantage of the mechanism, especially where the pile of sheets being acted upon is irregular, having a somewhat uneven upper surface, as for instance where the pile comprises a large number of sheets certain portions only of which have been previously printed. The air blast further functions to float each sheet, after its separation from the pile, forwardly to the conveyor, the suction gripper having engagement with the rear edge of the sheet during portion of its travel, and thus controlling its rate of movement, but the blast being active to facilitate the actual introduction of the leading edge of the sheet into the conveyor, maintaining this leading edge at such elevation that it passes freely over the holding-down member at the front of the sheet. In lieu of the air blast other means may be used to "fluff up" the rear edges of the uppermost sheets. The holding-down member should be so constructed that it cannot be engaged by, and hence block, the forward movement of the leading edge of a sheet being fed, whether an air blast or other means is employed to assist in the separation of the rear margins of the sheets.

In the accompanying drawings certain embodiments of the invention are illustrated and will be hereinafter described in detail. It will be appreciated, however, by one skilled in the art that the component elements of the invention may be considerably rearranged and modified in design to suit varying conditions, without departure from the teaching of the invention.

In the drawings:

Figure 1 is an end elevation of the upper portion of the frame upon which the sheet feeding mechanism is mounted, the principal elements of one form of the mechanism being illustrated;

Figure 2 is a top plan view of the same;

Figure 3 is a section on line 3—3 of Figure 2;

Figure 4 is a section on line 4—4 of Figure 1;

Figure 5 is an end elevation of portion of the mechanism shown in Figure 1, partially broken away to show details, this mechanism comprising a portion of the driving mechanism for the feeder;

Figure 6 is a side elevation of this mechanism as seen from the right in Figure 1;

Figure 7 is a section on line 7—7 of Figure 5;

Figure 8 is a section on line 8—8 of Figure 5;

Figure 9 is a section on line 9—9 of Figure 3, showing the suction ducts of the sheet gripping mechanism;

Figure 10 is a section on line 10—10 of Figure 3;

Figure 11 is a section on line 11—11 of Figure 2;

Figure 12 is a section on line 12—12 of Figure 9;

Figure 13 is a rather diagrammatic view showing in side elevation the principal operating parts of the mechanism for actuating the sheet gripping elements, portion of the conveyor being also shown;

Figures 14 to 19 inclusive are generally similar views but showing the sheet gripping element in the various principal positions which it occupies in traversing its cycle of movement;

Figure 20 is a graph showing the path of travel of the sheet gripping element of the feeder;

Figures 21 and 22 show, rather diagrammatically, the relative positions of the sheet gripping mechanism, the conveyor, and the impression cylinder of the press, Figure 21 also showing a series of overlapping sheets on the conveyor, and Figure 22 showing a series of single, non-contacting sheets passing to the impression cylinder, the two views in other words showing the sheet feeding mechanism adjusted for stream feeding and single sheet feeding, respectively;

Figure 23 is a vertical longitudinal section through the novel sheet feeding mechanism according to a modified form, the plane of the section being parallel with the path of movement of the sheets being fed;

Figure 24 is a top plan view of portion of the rear edge of the pile of sheets, together with that portion of the modified sheet feeding mechanism which directly overhangs the rear margin of the pile;

Figure 25 is a section on line 25—25 of Figure 1;

Figure 26 is a side elevation of portion of the mechanism illustrated in Figure 25, the mechanism being viewed from the left in this figure.

Figure 27 is a top plan view of the cam shown in Figure 26;

Figures 28 to 32, inclusive, are side elevations, rather diagrammatic, showing the suction gripper and its actuating mechanism in the principal positions which it successively occupies in gripping, separating and forwarding a sheet; and Figure 33 is a diagram which indicates the path of movement of a point on the sheet gripping element.

The sheet feeding mechanisms illustrated by way of example are designed primarily for the feeding of sheets to a printing machine or press. The various operating parts are mounted upon a frame which preferably is the same in width as the frame of the printing press with which it is used, although it may be made substantially narrower if desired, and the mechanism as an entirety is placed at the end of the press in position to feed sheets directly to the press impression cylinder. The feeding mechanisms shown are designed particularly to forward sheets to presses of one well-known type but obviously, by mere changes in design and reproportioning of the parts, the feeding mechanisms may be readily employed to feed sheets to presses of practically all sizes and makes, or to machines other than presses.

All of the elements of the mechanism illustrated in Figures 1-22 of the drawings are mounted upon a main frame comprising two parallel side frame members indicated at 10 and 11, respectively, together with suitable cross braces. A vertically adjustable pile board 12 supports a pile of sheets S to be fed. The gripper element which actually engages the rear margin of a sheet to be fed (the uppermost sheet of the pile S) is indicated at 13, and the mechanism upon which this element is supported and by means of which it is moved along a predetermined path for accomplishing its function, is mounted on a sub-frame generally indicated at M. The member for holding down the forward edge of the uppermost sheet is indicated at 14. The conveyor is generally indicated at C and the impression cylinder of the press at P. A housing upon which is mounted the driving means for the gripper element actuating means mounted on sub-frame M is generally indicated at D.

It will be understood that the conveyor C is in constant operation and adapted to receive and forward a sheet fed into its intake end at any time, and that the conveyor driving means actuates the conveyor at uniform speed so that each sheet moves toward the impression cylinder at a uniform rate after having been introduced into the conveyor. The sheet gripping element 13, in a single cycle of its operations, successively occupies the positions in which it is shown in Figures 13 to 19 inclusive, a point on the suction element or cup 13 moving from the point $a$, which corresponds to the position in which it is shown in Figure 19, in the direction of the arrow X, successively to the points $b$, $c$ and $d$, corresponding to the positions in which it is shown in Figures 14, 15 and 16, respectively, and thereafter reversing its direction of movement and passing through points $c$ and $b$, returns to the position $a$, Figure 17 showing the gripper element 13 at the point indicated at $c$ in Figure 20, upon its return movement, Figure 18 showing the gripper at the point $b$ and Figure 19 showing the gripper back at the point $a$ after having travelled in the direction of the arrow Y.

In Figure 13 a sheet of paper S' is shown in the position which it occupies just after having been released by the suction gripper 13, the leading edge of the sheet having entered the conveyor C and the trailing edge having fallen below the suction gripper 13. The suction gripper then starts its descent toward the next succeeding sheet S², moving successively through the positions in which it is shown in Figures 14 and 15 to the position in which it is shown in Figure 16, the gripper here being shown in actual contact with the sheet S² adjacent its rear margin. At this point a partial vacuum is established within the suction gripper so that the sheet is firmly gripped. The suction gripper 13 then rises (Figure 17), is rocked rearwardly to the position in which it is shown in Figure 18 to disengage the sheet S² from the holding-down member 14, and is then moved forwardly to the position shown in Figure 19, in which position the sheet is released by re-establishment of atmospheric pressure within the suction gripper, Figure 19 showing the gripper 13 at the end of its working stroke but just prior to the instant of sheet release.

The sheet gripping mechanism just above briefly described operates in synchronism with the printing press, more particularly the impression cylinder P, and the intermediate conveyor C is driven at one or the other of a plurality of predetermined speeds so that, regardless of whether the sheets are fed serially or in stream relationship, a fresh sheet will be removed from the pile and fed forwardly just as the impression cylinder removes a sheet which has previously been fed, the press thus clearing the conveyor at the precise rate that sheets are fed into the inlet end of the conveyor.

The details of the various instrumentalities whose functions have just been briefly explained will now be described. The pile board 12 is, as is usual in connection with many types of sheet feeding mechanisms, mounted for vertical movement, and means is provided for automatically raising the board, and the pile of paper superposed thereon, as sheets are removed singly from the top of the paper pile S. As will be observed in Figures 1, 3 and 4, the pile board 12 is supported at its ends by chains 20, each chain passing over a sprocket 21 positioned above the board and likewise passing around a sprocket or roller (not illustrated) below the board, the chains being in effect endless in that the ends of each chain are, respectively, attached to the pile board as indicated at 22 and 23, respectively. The sprockets 21 are fixed upon a horizontally disposed shaft 24 the ends of which are rotatably supported in bearings on the side frame members 10 and 11 respectively. By rotating shaft 24 the pile board may be raised or lowered as desired by means of the chains, which will be simultaneously and equally operated.

In the operation of the machine elevation of the pile board, as a pile of sheets resting thereon is exhausted by the feeding mechanism, is entirely automatic. One element of the automatic means for effecting pile board elevation comprises the member 14 heretofore referred to and which in effect performs a double function, i. e., that of holding down the forward margins of the sheets of the pile S and serving as a pile gauge or an indicator of the pile height which sets in operation the mechanism for feeding the pile upwardly as sheets are removed from its top in order to keep at all times the upper sheet of the pile in position to be engaged by the suction element 13. Member 14 is formed as an arm or lever one end of which is fixed upon a transverse rock shaft 25 and the other end of which extends over and rests upon the pile. Likewise fixed on shaft 25 is an arm 26 projecting rearwardly to a point approximately below the pile board elevating shaft 24. To the free end of arm 26 is pivotally connected a vertically extending thrust rod 27 the upper end of which is threaded to receive the internally threaded adjusting nut or sleeve 28.

Resting upon the upper surface of the adjusting nut is a roller 29, apertured to freely receive the upper end of thrust rod 27, and which in turn is secured to and projects laterally from a latch member 30. This latch is pivotally secured, as at 31, to the side frame member 11. The free end of the latch member serves as a stop for the half round pin 32 fixed upon the lower end of the lever 33, which lever is mounted for rocking movement on a stud 34, the end of which stud is supported in the side frame member 11. Rotatably mounted on stud 34 is a pinion 35 the teeth of which mesh with the teeth of a gear 36 fixed upon shaft 24. Connected to the pinion 35 so as to revolve therewith is a circular ratchet 37 and a feed pawl 38 mounted upon the upper end of lever 33 has its tooth in operative engagement with one or other of the teeth of this ratchet. Rotation of the ratchet by means of the pawl is effected by oscillation of lever 33 and, as the ratchet is advanced in a counterclockwise direction, the pinion 35 will be rotated in the same direction, the gear 36 in a clockwise direction, together with shaft 24 upon which gear 36 is fixed, and the sprockets from which the pile board supporting chains 20 are suspended, thus effecting elevation of the pile board.

Pivotally connected to the upper end of lever 33 is a thrust arm 40 the opposite end of which is bifurcated or yoke-shaped so as to receive a rotatable shaft 41. Upon shaft 41 is fixed an eccentric 42 and a roller 43 upon thrust arm 40 will be engaged by the periphery of the eccentric 42 when the thrust arm is moved downwardly and to the right (Figure 4). Normally, however, the thrust arm 40 with its roller 43 are held in the positions in which they are shown by the latch 30, which prevents movement to the left of the pin 32 under the pressure of the compression spring 45, the lever 43 and rod 40 being thereby held against movement. As the sheets are successively removed from the top of the pile, however, the member 14 will gradually fall or rock downwardly in a counterclockwise direction, allowing shaft 25 to rotate in the same direction, and gradually lowering the longer lever 26 with its attached thrust rod 27, thus permitting the latch 30 to gradually rock downwardly in a clockwise direction about its pivot 31. Ultimately the downward movement of the latch causes its free end to fall below and disengage the pin 32 whereupon the expansion spring 45 acts to rock lever 33 and retract the pawl 38 one tooth.

Simultaneously with the movement of lever 33 the thrust arm 40, which is connected to the upper end of lever 33, is moved downwardly and the roller 33 brought within the range of action of the eccentric 42, either at once or by rotation of the eccentric 42, depending upon the position of the eccentric when the latch 30 disengages the pin 32. In any event the roller moves toward the shaft 41, thus permitting pawl 38 to engage a fresh tooth, and is thereafter thrust rearwardly and upwardly, carrying the pawl 38 with it and advancing the ratchet and raising the pile board. As the pile board is raised, lever 14 is likewise raised together with lever 26 and thrust rod 27, the latch 30 being thus elevated and finally coming to rest in position to block the movement of pin 32 as before. Thus after each actuation of the ratchet and elevation of the pile board, the system of levers just described is locked until a predetermined number of sheets has been removed and the latch 30 has again fallen sufficiently far to disengage the pin 32.

Many types of automatic pile board mechanisms have heretofore been designed or suggested. Novelty is not claimed for the details of this mechanism except with respect to the arrangement of the pile engaging finger 14 which functions as a hold-down means for the forward margins of the paper sheets on the pile board and which therefore cooperates with the blast and the suction gripper in the forwarding operation as well as performing the additional function of detecting lowering of the pile and bringing about its elevation from time to time as necessary.

The detail mechanism for effecting the removal from the top of the pile of the uppermost sheet, and for forwarding this sheet to the conveyor will now be described. The housing upon which certain of the driving parts of this mechanism are mounted is indicated at D, this housing comprising a plate or flat casting disposed in parallelism with the side members 10 and 11 of the frame and positioned approximately midway between these members. It rests upon and is rigidly secured to a transversely extending supporting bar 51 the ends of which are mounted in the side frame members and is likewise supported by the pile board elevating shaft 24 and the cam shaft 41, both of which shafts are rotatably supported in bearings in the side frame members and also extend through bearings provided for their reception in the housing member D. Secured to the lower horizontally extending margin of housing D is a supporting bar 53 which overlies the pile board and projects for some distance rearwardly beyond the upwardly projected path of movement of the pile board. This supporting bar is preferably rectangular in cross-section but may have any suitable shape. The sub-frame indicated at M is provided with an elongated groove or recess of rectangular cross-section to receive the supporting bar 53 and is retained upon the supporting bar by means of upper and lower gibs 55 and 56, respectively, which overlap the supporting bar receiving recess and prevent lateral displacement of the sub-frame relatively to the bar. The sub-frame slides freely on the support 53 and may be adjusted longitudinally thereon, being retained or anchored in any desired position of adjustment by means of a thumb screw 57 (Figure 1).

Upon the sub-frame M is supported the mechanism which actually carries the sheet gripping elements 13 and upon the housing D is mounted the mechanism for actuating these elements, the two mechanisms being interconnected so that the sheet gripping and forwarding mechanism may be operated regardless of the position of the subframe M on its support 53.

It has previously been pointed out that the path of movement of the sheet engaging gripper element 13 is indicated in the graph shown in Figure 20. From the point a the gripper element moves successively through points b, and c to point d in approaching the sheet to be engaged and forwarded, making contact with such sheet at point d. Thereafter it is caused to retrace the same path, moving successively through point c and b to point a, this being the complete cycle of movement of the gripper 13. The working stroke of the gripper is of course the return stroke from the point d to the point a, during which portion of its travel a sheet of paper is gripped and carried thereby, such sheet being engaged when the gripper is at point d and discharged after the gripper has returned to point a. Hence the mechanism for manipulating the gripper element is necessarily designed to move it both horizontally and vertically.

For the purpose of permitting vertical movement of gripper 13 a rocker 60 is provided, this rocker extending in a generally horizontal direction and being adapted to rock about a horizontal axis. Thus it is mounted for rocking movement upon a pin 61 which extends through a boss 62, which boss forms part of the subframe M, and through the parallel arms 60' and 60² of the rocker, which is bifurcated and has one arm disposed on each side of boss 62, as shown in Figure 2. To the end of arm 60' is connected one end of a spring 63, the other end of which is anchored to the sub-frame, and this spring normally tends to rock the rocker member 60 in a counterclockwise direction (Figure 3) and to maintain the end of rocker arm 60² in contact with the horizontal abutment surface 64 of sub-frame M, in which position the rocker is shown in Figures 13, 14, 18 and 19.

In order that the gripper element 13 may be given the desired horizontal movement it is suspended from the rocker by means of a swinging carrier, pivotally connected to the rocker, and which may be oscillated forwardly and rearwardly of the feeding mechanism. This swinging carrier is indicated at 65. Swinging carrier 65 also supports at its lower end a rocking gripper support by means of which the gripper members 13 may be rocked about a horizontal axis in a circular path of short radius in the operation of the mechanism, thus increasing the total horizontal movement of the gripper element and moving this element in such manner as to facilitate sheet separation and delivery, the rocking movements of the gripper support being in timed relationship to the swinging movements of the carrier and to the movements of the rocker 60. It will be perceived that rocker 60 carries at its forward end a horizontally disposed pin 67 and that the upper end of the swinging carrier 65 is bifurcated, the two arms thereof being provided with aligned apertures to receive the end of this pin or pivot. The rocking gripper support comprises the horizontally disposed hollow cylindrical member 68, the ends of which are closed, and which is received within a horizontally disposed cylindrical aperture or bore extending transversely through the lower end of the swinging carrier.

Keyed upon the ends of the tubular member 68 are sleeve members 69 and 69', each of which is provided with a radial bore to receive, respectively, short tubular members 70 and 70' upon the outer end of each of which a suction gripper 13 is mounted. There may be one, two or more of the suction grippers thus secured to the rotatable gripper support 68, as may be desired. The swinging carrier 65 is provided with a duct 71 which is in communication with the interior of the tube 68 at all times, this tube having a transversely elongated port 72 which is always in register with the duct 71, and tube 68 is likewise in constant communication with the interior of each gripper element 13 through the tubular members 70. Establishment of a sub-atmospheric pressure in the duct 71 of course results in the establishment of a sub-atmospheric pressure in the grippers 13 and, during the operation of the device, such sub-atmospheric pressure is periodically established and discontinued.

The swinging carrier 65 has an integral forwardly projecting arm 75 at its upper end, which arm is connected by means of a pivot pin 76 to a block 77 which is slidably mounted upon a horizontally disposed bar 78 which, when the mechanism as an entirety is operated, has a controlled rising and falling movement and comprises the means for transmitting driving force from the driving mechanism to the gripper element actuating device, bar 78 remaining horizontal and parallel to supporting bar 53 throughout its cycle of movement, thus permitting adjustment of the sub-frame M and its associated mechanism longitudinally on the support 53 while maintaining at all times its driving connection to this mechanism. Mounted upon one side of the swinging carrier 65, and directly beneath the bar 78, is a roller 80, this roller being adapted to be engaged and disengaged by the rising and falling operating bar during the operation of the mechanism, as will be hereinafter described.

It will be perceived from an inspection of Figure 12 that the sleeve 69' mounted upon one end of the rocking gripper support 68 is provided with two substantially radially extending lugs 82 and 83, respectively. Lug 83 normally rests against a stop pin 84, rigid with the lower end of carrier 65, and a tension spring 85, connecting the end of lug 82 to a pin 86, tends to rotate sleeve 69 and tube 68 upon which it is mounted in a clockwise direction at all times, to maintain this contact between lug 83 and stop pin 84. Lug 82 likewise carries a roller or pin 87, which projects horizontally therefrom and directly underlies a horizontally extending cam 88, rigidly secured to the sub-frame M and which may be designated a gripper support rocking cam. It will be perceived that if the carrier 65 is drawn upwardly, the roller 87 will contact the lower surface of cam 88 which will effect rocking movement of the gripper supporting member 68 in a counterclockwise direction (Figure 12) against the action of spring 85. When the swinging carrier moves downwardly to disengage roller 87 from the undersurface of cam 88 spring 85 becomes active and rotates the gripper support until lug 83 is in contact with stop pin 84. In this position, it will be observed, the peripheral edges of the gripper or suction cups 13 are in a substantially horizontal plane.

Referring again to Figures 13 to 20 inclusive. The operating bar 78 is shown in its highest position in Figure 19 and in this figure the swinging carrier 65 is also shown in its position of maximum forward swing. The rocker end 60² is seated upon the abutment surface 64 and the roller 87 is shown to be in contact with the outer end of cam 88, having moved outwardly along the upwardly curved cam surface of this cam, the spring 85 being in tension. The rocking gripper supporting shaft 68, and sleeves 69 and 69' are so positioned that the peripheral edges of the suction grippers 13 are disposed in a plane only slightly inclined to the horizontal so that the sheet S' is not severely flexed. It is the function of the cam 88 to so control the angular position of the rocking gripper supporting shaft 68 during the forward swinging movement of the carrier member 65 that the plane of the lower peripheries of the suction grippers does not depart substantially from the horizontal. At this point communication between the grippers and the source of reduced pressure is interrupted, and atmospheric pressure restored in the grippers, so that the sheet S' is released thereby, the leading edge of this sheet having been introduced into the conveyor.

In Figure 13 the actuating bar 78 is shown in a slightly lower position, downward movement of the grippers having commenced, the carrier 65 having started its rearward swing and the roller 87 having returned a short distance along the curved cam surface of cam 88 but spring 85 being still in tension. Continued downward movement of the actuating bar 78 brings its undersurface in contact with roller 80, as indicated in Figure 14, and bar 78 is no longer effective in swinging the carrier 65 rearwardly through force transmitted thereto through the carrier arm 75 from the slide block 77, the bar in effect acting upon the swinging carrier at two points on opposite sides of its axis of swing, i. e., through the slide block and through the roller 80. Thereafter during the downward movement of the actuating bar the angular position of the swinging carrier 65 is fixed and downward movement of the carrier is possible only because of the ability of the rocker 60 to tilt, tilting of this rocker commencing immediately upon contact of the actuating bar with roller 80. Further downward movement of the actuating bar 78 results in lowering of roller 87 out of contact with cam 88 so that the spring 85 is effective to rotate the gripper support until the peripheral edges of the grippers are disposed in a horizontal plane, or are in parallelism to the upper surface of the pile of sheets, which is the position which the gripper edges should occupy when the uppermost sheet of the pile is engaged. The lowest position of the operating bar 78 is indicated in Figure 16, the grippers being in contact with the upper sheet of the pile and suction being established at this instant.

The positions which the respective elements occupy during the sheet feeding movement of the grippers is indicated in Figures 17, 18 and 19. It will be noted particularly that in Figure 18 the rear edge of the sheet S' has been drawn rearwardly and inclined upwardly by the gripper mechanism, this not only for the purpose of withdrawing the forward margin of the sheet from beneath the holding-down member 14 but also for the purpose of separating the rear edge of this sheet from the rear edge of the next sheet S² to permit the blast of air issuing from the blast device B to penetrate between sheets S' and S² and to separate these sheets one from the other over their entire areas, or float the upper sheet S', so that during the forward feeding movement of the gripper element the leading edge of this sheet will easily pass upwardly to the conveyor, as indicated in Figure 13.

The air blast is delivered, as just mentioned, from an air nozzle device indicated at B and this blast is uninterrupted during the operation of the sheet feeding mechanism. The air nozzle or jet device B is supported beneath the sub-frame M, being preferably attached to this sub-frame by means of a short threaded tubular member 95 the upper end of which is threaded into the lower end of a bore 96 formed in the sub-frame and the lower end of which is threaded into a bore in the upper face of the jet device B, and which is in communication with the horizontal duct 96' formed in the member B. Pivotally secured to the air jet device B is a deflecting plate 97 by means of which the air jet may be controlled and directed so as to most efficiently act upon the upper sheet of the pile to effect separation thereof from the remaining sheets. This guide plate 97 is secured in any desired position of adjustment by a clamping screw 98.

The bar 78 is oscillated vertically by means supported on the housing D. Pivotally mounted upon pins 100 and 101 fixed in this housing are two bar operating levers, a three-armed lever 102 mounted upon pin 100 and a three-armed lever 103 mounted upon pin 101. Parallel downwardly extending arms of these levers are connected by a link 104 so that the levers are constrained to simultaneous rocking movements through equal angles. One arm of lever 102 is pivotally connected to actuating rod 78 at 105 and an arm of lever 103, of the same length and inclined at the same angle, is pivotally connected to bar 78 at 106. Hence it is clear that rocking movements of these levers must be equal and simultaneous and will bring about substantially vertical rising and falling movements of the actuating bar 78. A spring 107 acting upon an upwardly extending arm of lever 102 tends to rock both levers in a clockwise direction (Figure 11) and causes the cam follower 108 rotatably mounted upon the upwardly extending arm of lever 103, to bear at all times against a cam 110 fixed upon cam shaft 41 previously referred to. Rotation of cam shaft 41 and cam 110, therefore, brings about rocking movements of the levers just described and rising and falling movements of the actuating bar for the gripper manipulating means.

The conveyor employed to effect the transfer of sheets to the printing machine or press may vary in details of construction as may be desired. Advantageously it may include a series of parallel endless tapes 112, the upper reach of each of which passes over a conveyor board 113 suitably supported upon the frame, and which also pass over rollers indicated at 114 and 115, respectively, the roller 114 being driven and the roller 115 being either a driven or an idler roller. A tension roller of customary type is indicated at 116. Upper and lower guides for the leading edges of sheets being fed are indicated at 117 and 117', respectively, the guides 117 being secured to the under-surface of the supporting bar 51 and the guide 117' being suitably mounted upon the frame and the conveyor board.

The driving mechanism for the conveyor pulley shaft 118 is illustrated in Figures 5, 6, 7 and 8, respectively. A sprocket 120 mounted on and secured to a sleeve 121 constitutes the source from which the power for driving the conveyor is taken, likewise the source from which the power for driving the cam shaft 41 is taken.

This sprocket is connected by means of a chain (not illustrated) to any suitable means for driving it at the desired speed and in synchronism with the driving mechanism of the press. Conveniently it may be driven directly from a second sprocket mounted upon one of the rotating parts of the press driving mechanism. The sleeve 121 is rotatably supported in a bushing 122 mounted in a bearing 123 formed in the side frame member 10. Keyed to the outer end of sleeve 121 is a gear 124 the teeth of which mesh with those of a gear 125 which is rotatably mounted upon a sleeve encircling the end of the conveyor pulley shaft 118. The teeth of gear 125 in turn mesh with those of an idler pinion 126 rotatably mounted upon a stud 127 projecting laterally from the side frame member 10 and pinion 126 drives gear 128 fixed upon the outer end of the cam shaft 41. Hence it is clear that the cam shaft 41 is operatively connected at all times with the driving sprocket 120 through the train of gears just described.

It will be observed that conveyor pulley shaft 118 has a reduced extension 118' upon which is fixed a gear 129. Rotary motion of gear 125 may be communicated to gear 129, and hence to conveyor pulley shaft 118, through an over-running clutch positioned intermediate the mutually facing surfaces of these gears, and which is shown most clearly in Figure 7. The larger gear 125 carries a clutch member in the form of a ring 130 and the smaller gear 129 carries a toothed clutch member 131 having a plurality of substantially tangential flat surfaces 132, balls or rollers 133 being interposed between the cylindrical inner surface of ring 130 and the several tangential surfaces 132 of clutch member 131. When the gear 125 is driven in the direction of the arrow R (Figure 7) the rollers 133 will act to clutch the ring 130 to the hub 132 and hence gear 129 and shaft 118 will be driven. In the event that shaft 118 should be driven by other means, however, also in the direction of the arrow R, but at a higher angular velocity than that at which gear 125 is driven, the clutch will be disengaged.

Means is provided for independently driving gear 129 from the sprocket 120, this means comprising the intermeshing gear 135 fixed upon the end of the short shaft 136 which projects through and is rotatably supported by the sleeve 121. Fixed upon the inner end of shaft 136 is a hub 137 and this hub is provided with an aperture 138 eccentric to the axis of shaft 136 and parallel thereto, which houses a slidable clutch member 139, movable longitudinally in the recess 138 by means of an operating handle 140. Aperture 138 may be brought into register with an arc-shaped aperture 141 formed in the enlarged inner end of the sleeve member 121 and when these apertures are in registration the clutch member 139 may be thrust inwardly toward the sprocket 120 so as to enter the aperture 141 and to operatively connect hub 137 and sleeve 121. When this has been done both sleeve 121 and shaft 136 will be driven from the sprocket 120 and as a result gear 135 will function to drive gear 129 keyed on the shaft 118. Gear 129 will be rotated at a substantially higher speed than gear 125 by reason of the fact that driving gear 135 is of larger diameter than driving gear 124 and driven gear 129 is of substantially smaller diameter than that of driven gear 125. Whether or not the hub 37 is or is not clutched to the sleeve 121, however, the cam shaft 52 will be driven, and at a speed which is invariable so long as the speed of rotation of sprocket 120 remains unchanged. Where the clutch member 129 is in disengaged position, however, conveyor pulley shaft 118 will be driven through the clutch described at one speed of rotation but where the clutch member 139 has been moved inwardly and shaft 136 is positively driven from the sprocket 120 the shaft 118 will be driven at a higher speed, for instance at twice the speed of shaft 52, the clutch no longer serving to connect gears 129 and 125. By the mechanism just described the speed of sheet feeding by the conveyor may be modified without modifying the frequency with which sheets are fed forward to the conveyor by the sheet separating and forwarding mechanism, thus making it possible for the operator to feed sheets singly through the conveyor to the press, as indicated in Figure 22 or, by decreasing the speed of the conveyor tapes, to cause sheets to be fed to the press in overlapping relationship, as indicated in Figure 21, this method of feeding being generally designated "steam" feeding. The driving mechanism for the conveyor and cam shafts may be further modified if desired so that sheets are fed in stream formation but with varying degrees of overlap and it will be clear that for the specific mechanism described numerous other types of drives might be substituted to obtain the desired result.

Any suitable compressor may be utilized for supplying to the blower a stream of air under pressure and no such means is illustrated. It need only be said that the air may conveniently be conducted through a suitable conduit to a valve box 145 supported upon the frame member 10, and that a rotatable valve member 146 may be utilized to control the volume and pressure of the air passing to the blower. Valve box 145 is connected by a tubular conduit to the sub-frame M, this conduit including the flexible hose 147, the end of which remote from the valve box is connected to the tube 148 mounted on the sub-frame and which communicates with the compressed air duct 96.

Likewise any suitable valve controlled suction pump may be employed for establishing a less than atmospheric pressure in the duct 71 in the swinging carrier member 65, such pump being connected to a valve box 149 conveniently mounted upon the frame member 11 and having a control valve 150 by means of which the degree of suction may be regulated. The outlet of the valve box 149 is in communication with a flexible hose 151 the opposite end of which is attached to a short tube 152 secured to the swinging carrier 65 and in communication with the duct 71 in such carrier. The flexible conduits 147 and 151 permit adjustment of the sub-frame and swinging movement of the carrier 65 respectively, without interruption of the compressed air supply or interruption of communication with the source of reduced pressure.

The transverse bar 155 illustrated in Figures 1, 2 and 3 underlies the sub-frame M and at its mid-point is rigidly attached to this sub-frame. The bar is disposed horizontally and also in parallelism to the rear edge of the pile board. Upon this bar are mounted sliding blocks 156 which may be adjusted as desired toward or away from the sub-frame. Each such block carries a depending member 157 which is mounted in the block for limited vertical sliding movement. To the lower end of each depending member 157 is a short horizontally disposed lateral projection 158 and upon each such projection 158 is mounted the upwardly projecting flat spring finger 159.

These spring fingers serve to assist the operator in locating the sub-frame M so that the gripping mechanism associated therewith and carried thereby is properly located in sheet gripping position above the rear margin on the pile board. In thus locating the sub-frame it is gradually moved forwardly until the spring fingers are in contact with the rear vertical surface of the pile and, when thus in contact, the suction gripper will be located in its operative position with respect to the pile.

The spring fingers 159 not only function as guiding elements in precisely locating the sub-frame M, but are also of service in the feeding of sheets, particularly sheets of light weight and which are therefore comparatively flimsy and flexible. Thus when the suction gripper 13 is retracted in its top sheet withdrawing motion, the corners of the sheet which is gripped will strike the spring fingers 159. While of very light construction, these spring fingers will nevertheless offer sufficient resistance to the edge of a comparatively thin sheet to laterally deflect these edges and, in effect, to curve or arch the rear edge of the sheet. The curvature thus imparted tends to separate such sheet from a second sheet which may possibly have adhered to its undersurface, especially where the sheets are relatively thin and porous so that the effect of the suction gripper is felt not only on the uppermost sheet but, to a limited extent, upon the second sheet. Where the sheet feeding mechanism is dealing with sheets which are comparatively dense or non-porous, and relatively thick, the rear edge of each sheet as it is retracted by the suction gripper will merely deflect the spring fingers, as indicated for instance in Figure 18, the spring fingers returning to their vertical positions respectively after the sheet has been fed forwardly, as indicated in Figure 19. If desired, spring members 159 may be supplanted by stiff members, pivotally mounted and resiliently in vertical position.

The vertically sliding depending members 157 overlie the rear edge of the pile board so that, with diminishing in height of the pile and rising of the pile board, the lower ends of these depending members eventually are contacted by the upper surface of the pile board. During the removal of the comparatively few remaining sheets from the pile, the spring finger supports will be gradually elevated, and will continue to move upwardly until the pile has been exhausted. When the pile board is lowered, however, the spring fingers and their supports will automatically drop to their lowermost positions, as shown in Figure 1.

It will be observed that the pile holding-down member 14 is provided with a downwardly projecting portion 14' integral therewith, which lies immediately adjacent the forward face of the pile on the pile board. It is the function of this downward projection of the holding-down finger to prevent forward displacement of sheets if for any reason the uppermost sheets of a pile are subjected to some force tending to move them forwardly. It is clear, therefore, that the holding-down member 14 performs several functions. Its most important function is to facilitate sheet separation by exerting a light pressure upon the forward margins of the uppermost sheets of the pile, the action of this member being such as to preserve the integrity of the pile by acting thereon continuously during the time that the suction gripper or other sheet retracting element is actually active in retracting the sheet from beneath the holding-down member. As previously explained, likewise the holding-down member comprises an element of the pile raising mechanism. As just pointed out, this member is so formed that it comprises a stop limiting the forward movement of the uppermost sheets of the pile should any force be applied to these sheets tending to produce such movement.

In the modified construction illustrated in Figures 23–33 of the drawings many of the elements shown are identical in construction and function with those disclosed in the earlier figures of drawings and need not be described in any detail again. In this embodiment, a pile of sheets P is supported upon a pile board 210 which pile board is automatically elevated as sheets are withdrawn from the top of the pile. One part of the pile elevating mechanism comprises the holding-down finger 211, the end of which overlies and rests upon the forward margin of the pile and serves not only as a pile height indicator but likewise functions to prevent forward motion of all of the uppermost sheets of the pile except the top sheet which has been gripped by the gripping element and pulled rearwardly so that its forward margin is pulled from beneath member 211. The sheet gripping element comprises a rubber suction device, indicated at 212, and mounted over the rear margin of the pile in position to engage the rear margin of the uppermost sheet, move this margin simultaneously upwardly and rearwardly to elevate it and withdraw the front edge of the sheet from beneath member 211, and then to move the sheet forwardly, with the aid of an air blast, so that its forward margin passes between conveyor rollers 213 mounted on conveyor shaft 214, and the pressure rollers 215, the sheet being positively gripped as soon as its forward edge enters into the bite of rollers 213 and 215 and being rapidly conveyed forwardly over the conveyor board 216 to a printing press or the like.

The major portion of the mechanism for actuating the gripping element 212 is described in detail in my copending application and it need only be said here that the mechanism as an entirety is supported upon a main frame of which one of the principal or side members is indicated at 217. A housing indicated at 218 supports a system of levers for converting rotary motion of the cam shaft 219 into substantially vertical reciprocatory motion whereby a horizontally disposed actuating bar 220 is caused to rise and fall while constrained at all times to maintain a horizontal position, the actuating bar 220 thereafter serving to transmit driving force from the cam shaft to the mechanism upon which the gripper 212 is immediately mounted. This last mentioned mechanism is supported upon a subframe 221 which is slidable along a horizontally disposed supporting bar 222 which overlies the pile board 210 and the forward end of which is rigidly connected to the housing 218. The actuating bar 220 in all of its positions is disposed parallel to the supporting bar 222 this arrangement permitting adjustment of the gripper actuating means along the supporting bar 22 as may be desired, to adjust the sheet feeding mechanism for the handling of sheets of different sizes, without requiring disconnection of the driving connection to effect such adjustment.

Subframe 221 has mounted thereon a rocker 225 extending generally horizontally and mounted for rocking movement about a pin 226 which extends through aligned apertures in the parallel legs 225a and 225b of the rocker and through a vertical intermediate web 220a of the subframe. To the rear end of the leg 225b of the rocker is attached the upper end of a spring 227 and the lower end of this spring is connected to the subframe 221. The spring is normally in tension and hence tends to maintain the rocker in a generally horizontal position with the lower surface 225a' of rocker leg 225a in contact with the upwardly facing surface 221' of the subframe, contact of these surfaces limiting counter-clockwise movement of the rocker. Pivotally connected to the forward end of the rocker by means of a pin 230 is a swinging carrier 231 which depends from the rocker and is adapted to have, in the operation of the mechanism, a forward and rearward swinging motion about the axis of the pin 230, from the angular position in which it is shown in Figure 28 to that in which it is shown in Figure 32 and thence a forward swinging movement again to the position in which it is shown in Figure 6.

The swinging carrier 231 supports at its lower end a rocking gripper supporting member in the form of a tube 233, tube 233 being disposed horizontally and fitting closely within a horizontal bore in the lower end of carrier 231. The tube 233, however, is in turn rockable or revoluble about its longitudinal axis to a limited extent, with respect to the carrier 231. Mounted upon the ends of tubes 233 are caps 234 and 235, respectively, which caps carry tubes 236 and 237 upon which the suction gripping elements 212 are secured, the interior of each of these elements 212 communicating through the tubular member upon which it is mounted with the hollow interior of the rocking gripper support 233 and the hollow interior of the gripping support being in constant communication with a duct 237 formed in carrier 231 the upper end of duct 237 having connected thereto one end of a tubular conduit 238 leading to a vacuum pump or any other source of sub-atmospheric pressure, a suitable valve being interposed and atmospheric pressure re-established in these elements at the proper times.

The carrier 231 has a rigid arm 240 at its upper end, extending forwardly and this arm is connected by means of a pivot bolt 241 to a slide 242 mounted upon the actuating bar 220. As the actuating bar 220 rises and falls, therefore, the carrier 231 will be rocked about the pin 230 and the arrangement is such also that the rocker 225 will be rocked about its own horizontal axis. Thus the carrier 231 has mounted thereon a roller 245 which lies beneath the actuating bar 220 and in the vertical plane of movement of this bar so that, at a certain point in the downward movement of the bar, its undersurface contacts with the roll 245. Mounted upon the subframe 221 and extending horizontally forwardly therefrom is a cam 246, the undersurface of this cam, which is curved as shown in Figure 4 and other figures of the drawings, overlying a pin or roller 247 carried upon arm 248 of the cap or sleeve 235. A pin 249 upon arm 248 is connected by a tension spring 250 to a pin 251 rigidly secured to carrier 231, as shown, spring 250 being normally in tension and tending to maintain the rocking gripper element 233 in the position in which it is shown in Figure 4, with the leg indicated at 252 in contact with pin 253 rigidly mounted upon the lower end of the carrier 231. It will be perceived that, if the carrier 231 be elevated, so that roller 247 contacts the surface of cam 246, the sleeve or cap 235 and the gripper element 233 to which it is pinned, will be rotated in a counter-clockwise direction (Figure 26) and hence the suction gripping elements 212 caused to describe an arcuate movement about the axis of the tubular member 233. Lowering of the carrier 231 will result in disengagement of the roller 247 and the cam 246 so that the suction grippers will return to the positions in which they are shown in Figure 26, the lug 252 coming to rest upon pin 253.

Mounted upon cam 246 is a movable cam part 255, this cam part being located within a lateral recess formed in the cam 246 and mounted for rocking movement about the pivot pin 256, its motion in a clockwise direction (Figure 26) being limited by contact of the cam with the marginal wall 246' of the recess in which it is mounted. The curved lower edge of the movable cam part 255 directly overlies the roller 247 and is adapted to be contacted by this roller when the carrier 231 is lifted for a purpose now to be fully described.

Referring now to Figures 28 to 33 of the drawings. In Figure 28 the various moving parts of the feeding mechanism are shown in the positions in which they occupy immediately after the conclusion of a sheet engaging and feeding operation, the sheet S having just been disengaged by the suction gripping elements 212 and the forward edge of this sheet having already been engaged by the conveyor. The mechanism will be operated to bring the suction elements 212 downwardly into contact with the next sheet to be fed, indicated at $S^2$, and to effect this gripping of the next sheet, the actuating bar 220 is brought downwardly from its highest point of travel, indicated in Figure 28, to its lowest point of travel, shown in Figure 31. When the actuating bar is elevated as in Figure 28 the lower margins of the suction gripping elements 212 are substantially horizontally disposed, it being a function of the cam 246 to maintain these edges in substantially horizontal planes as the suction gripping elements move forwardly toward their final discharging positions, and thus to not unduly flex the sheet. In Figure 28 the roller 247 is shown to be in engagement with the curved undersurface of the forward end of cam 246 and the lug 252 is out of contact with pin 253. As the actuating bar 220 descends the carrier 231 is rocked rearwardly, roller 247 sliding along the undersurface of cam 246 to the position in which it is indicated in Figure 29. Further downward movement of actuating bar 220 causes some further rearward tilting of carrier 231 until the undersurface of bar 220 comes in contact with roller 245 mounted upon carrier 231 and at the instant of contact further rearward rocking movement of carrier 231 is prevented. Just prior to such contact, however, roller 247 has contacted with the forwarding edge of the movable cam part 255 and caused this member 255 to rock upwardly about its axis, to the position in which it is shown in Figure 30. As the rod 220 continues downwardly, carrying with it the carrier 231, the rocker 225 is necessarily caused to rock downwardly in a clockwise direction about its pivotal axis 226 and the roller 247 leaves the undersurface of cam 246, permitting the rocking gripper supporting element 233 to assume the position in which it is shown in Figures 26 and 31 under the action of spring 250, with the planes of the lower suction gripping elements 212 substantially parallel to the plane of the sheet just about to be engaged thereby. As grippers 212 come into contact with the sheet (Figure 31) the cam part 255, which is in the nature of a swinging latch, falls to its normal position shown in Figure 31, directly overlying the roller 247. As the actuating bar 220 is raised, therefore, the rocking gripper support 233 immediately commenced to revolve, being constrained to do so by immediate contact of roller 247 with the undersurface of the cam part 255. It will be appreciated that, by reason of the relative positioning of the axis of the rocking member 233, the roller 245, and the pivot pin 256, and further by reason of the shape of the undersurface of the cam part 255, this cam part will not be revolved about its pivot pin 256 by the upward pressure of the roller 247, but will, during the time that the actuating bar 220 is rising, remain in the position in which it is shown in Figures 26, 31 and 32. This causes the suction grippers to follow an arcuate path rearwardly and upwardly throughout the entire upward movement of these grippers, thus causing rearward motion of the gripped sheet throughout the entire upward movement of the grippers, this arcuate upward and rearward path of movement being indicated by the arcuate line $a$, $b$, in Figure 33 of the drawings. During the operation of the apparatus, an air blast is played against the rear edges of the sheets, particularly in the vicinity of the suction gripping mechanism, portion of the air blast means being indicated at 260 in Figures 23 and 32. The rear edge of the sheet is thus tilted as it is elevated to facilitate the entrance between this sheet and the next lowermost sheet of the air current to facilitate separation of the two sheets throughout their entire areas. The air blast, being continued during the forward motion of the sheet, floats the sheet toward the conveyor in known manner. The forwarding motion of the suction grippers is substantially along the arcuate path indicated by the line $b$, $c$ in Figure 33 of the drawings, in the direction of the arrow $x$. After the sheet is released at the point $c$, in which position the grippers occupy the positions in which they are shown in Figure 28, return movement of the grippers is commenced in the direction of the arrow $y$, this return movement continuing until the point $d$ is reached, which is the position in which the grippers are illustrated in Figure 30. Thereupon, as the grippers are caused to further descend, they first are rocked forwardly along the arcuate path $d$, $e$, while the roller 247 is yet in contact with the cam 246 but, after this pin reaches the lower edge of the cam and the lug 252 is in contact with the pin 253, further rocking movement of the gripper support 233 is discontinued and the grippers descend vertically along the line $e$, $a$, the gripping elements again engaging the sheets at the point $a$. This cycle of movements is rapidly repeated for successive sheets and, if desired, the sheets can be easily sent forward in overlapping or stream relationship with the desired degree of overlap. By the use of the novel cam mechanism disclosed the desired arcuate or simultaneous upward and rearward movement of the rear edge of the sheet may be obtained while at the same time the desired vertical movement of approach of the grippers toward the sheet is realized.

The blast of air directed against the rear of the pile, adjacent the sheet gripping mechanism, is maintained at all times during the operation of the feeder and the rear portions of the uppermost sheets are separated from the pile and from each other by this blast. From five to fifteen or twenty of the uppermost sheets are "fluffed up" by the blast in this manner, depending upon the weight and stiffness of the sheets being fed. It is not necessary that the suction gripping elements be lowered into solid contact with the pile to insure gripping of the uppermost sheet. In fact, the suction element may be lowered only into close proximity to the uppermost sheet which, partially because of suction above it and partially because of air pressure below it, will rise against the suction gripper and be securely gripped thereby. Or the suction element may be lowered into actual contact with the uppermost sheet but this contact will be very light because of the fact that this sheet has been separated from the underlying sheets.

From the foregoing description the precise mode of operation of the various operative elements of the sheet feeding mechanism will be apparent. Sheets of various sizes, weights and qualities may readily be fed to the conveyor and thence to any mechanism, such as a press, folder, slitter or the like. By simple manipulation the mechanism may be adjusted for the feeding of sheets serially or in overlapping relationship. In the event that the mechanism is constructed so as to be primarily intended for the feeding of very large sheets, it may not be desired to feed the sheets serially at any time. In such case the variable speed driving mechanism for the conveyor may be so designed that the degree of overlap of the sheets may be readily changed. Ordinarily, however, this change speed mechanism will be made use of for the purpose of adjusting the press for either stream or serial feedings.

As already pointed out, one of the most important novel features of the present invention is the provision of a single positive gripping member operative upon the successive top sheets of the pile at points adjacent their rear edges to effect the removal of the sheets from beneath the hold-down and gauging element, to effect the separation of the sheets from the pile, and to initiate the forwarding movement of the sheets in the line of feed of the conveyor. Although the conventional roller and tape conveyor employed does seize the sheets before the trailing edges thereof have completely left the horizontal confines of the pile, and although the air blasts aid in facilitating the separation and removal of the sheets, it is proper to describe the suction gripper member as the sole means for gripping and initiating the forwarding movement of the sheets from the pile; especially, in contradistinction to devices which have heretofore been proposed for use in connection with other gripping, rubbing, or handling members operating upon various areas of the top sheets. Also, while the sheet handling member is described as a "single" member or means, this member as a whole may be provided with as many points of contact and adhesion to the sheet adjacent the rear edge of the sheet as necessary or desirable, considering the size and texture of the material being handled, provided that all of these points, such as the suction cups illustrated herein, operate in unison and in similar paths upon actuation of the member.

Having thus described the invention, what is claimed as new and desired to be secured by Letters Patent is:

1. A sheet feeding mechanism comprising in combination, a conveyor for forwarding sheets to a printing machine or the like, a device for feeding sheets to said conveyor, a source of power, a gear train connecting said power source to said device to effect operation of said device, means for taking power from said gear train to operate said conveyor, a second gear train, means for connecting said second gear train to and disconnecting it from said power source, and a clutch for automatically connecting said second train to the conveyor when said means is operated to connect said second train to said source of power, whereby said conveyor is operated at a different speed.

2. A sheet feeding mechanism comprising in combination, a conveyor for forwarding sheets to a printing machine or the like, a device for feeding sheets to said conveyor, a revoluble member adapted to be driven at a constant speed, means for connecting said member to said conveyor whereby said conveyor may be operated at one of a plurality of desired speeds, said means including an element which rotates at a constant angular velocity at all times, and second means for operatively connecting said element to said feeding device whereby the latter will be driven at constant velocity regardless of change in the speed of operation of the conveyor.

3. A sheet feeding mechanism comprising in combination, a conveyor for forwarding sheets to a printing machine or the like, said conveyor including a rotatable shaft from which it is driven, a device for feeding sheets to said conveyor, said device having also a rotatable actuating shaft, a rotating power driven member, a gear train operatively connecting said member and the actuating shaft of the sheet feeding device, said gear train including a gear mounted for free rotation on said conveyor driving shaft, an overrunning clutch associated with said conveyor driving shaft through which driving power may be communicated to said shaft from said freely rotatable gear, and a second gear train, said second gear train being adapted to be connected to said power driven member and being directly connected to said conveyor driving shaft, the first gear train serving to drive the conveyor driving shaft when the second is idle, through said clutch, and the second gear train driving said shaft directly, and at higher speed, when said second gear train is connected to said power source, the clutch overrunning when the second gear train is so connected.

4. A sheet feeding mechanism comprising in combination, a frame, adapted to support a sheet carrying pile board adjacent a sheet conveyor, a supporting bar rigidly mounted on the frame and projecting over the pile board, a sheet gripping element, and mechanism adjustably mounted on said supporting bar for actuating said element to feed sheets from a pile on said board to said conveyor.

5. A sheet feeding mechanism comprising a horizontally extending support, a frame slidable on said support, a sheet gripping and forwarding element below the support, and means mounted on said frame which, when actuated, moves said element along a predetermined path to successively grip and forward sheets.

6. A sheet feeding mechanism comprising a horizontally extending supporting bar, a frame slidable on said bar, a sheet gripping element, means on said frame which, when actuated, moves said element along a predetermined path to successively grip and forward sheets, a power source, and a driving connection between said power source and means whereby said means may be operated for all positions of said frame.

7. In a sheet feeder, in combination, a main frame, a sub-frame adjustably supported by the main frame, means supported by the sub-frame for moving a sheet gripper along a predetermined path to grip and forward a sheet, a driving shaft rotatably mounted in the main frame, and mechanism operatively connecting said shaft and means whereby said means is operated in all of its positions of adjustment.

8. In a sheet feeder, in combination, a sub-frame, a main frame having a part upon which the sub-frame is slidably supported, sheet gripper actuating mechanism mounted on the sub-frame and movable therewith, a driving element movably supported in the main frame, and means connecting said element and mechanism whereby the mechanism may be actuated for all positions of adjustment of said sub-frame.

9. In a sheet feeder, in combination, a sub-frame, a main frame having a part upon which the sub-frame is slidably supported, sheet gripper actuating mechanism mounted on the sub-frame and movable therewith, a driving element movably supported in the main frame, and means connecting said element and mechanism whereby the mechanism may be actuated for all positions of adjustment of said sub-frame, said means including an operating rod disposed in parallelism to said supporting part, and connections between said element and rod by means of which the rod is moved bodily toward and away from said supporting part while maintaining its parallel relationship thereto.

10. In a sheet feeder, in combination, parallel horizontally disposed elongated members, mechanism for actuating a sheet engaging and gripping element, slidably mounted on one of said members, a block slidably mounted on the other member, and means connecting said block and mechanism whereby the mechanism may be actuated when said members are moved toward and away from each other for all positions of the mechanism on its supporting member.

11. Sheet feeding mechanism comprising, in combination, a sheet gripping element, an actuating means for the sheet gripping element whereby said element may be moved along a predetermined path to effect vertical and horizontal movement of a sheet, said means moving said element horizontally forward and rearwardly of its sheet gripping position and including a lever rockable about a fixed axis, and a carrier for said gripping element pivoted to said lever.

12. Sheet feeding mechanism comprising, in combination, a sheet gripping element, an actuating means for the sheet gripping element whereby said element may be moved along a predetermined path to effect vertical and horizontal movement of a sheet, said means moving said element horizontally forward and rearwardly of its sheet gripping position and including a lever rockable about a fixed horizontal axis, a carrier member pivotally hung from said lever, a gripper support rockably mounted on said carrier, a device for rocking said lever, and a device for rocking said gripper support.

13. Sheet feeding mechanism comprising, in combination, a sheet gripping element, a gripper support rockable about a horizontal axis, a carrier member in the lower end of which said support is rotatably mounted, a fixed cam, and means for swinging said carrier about a horizontal axis and raising and lowering the same, the cam lying in the vertical path of movement of the gripper support and serving to rock said support when the carrier is raised.

14. Sheet feeding mechanism comprising in combination, a sheet gripping means adapted to be positioned above a pile of sheets for gripping one margin of the upper sheet of the pile, means for separating the superposed margins of the uppermost sheets of the pile immediately below said first means, and a holding down member remote from both of said means.

15. The combination set forth in claim 14 in which said second means comprises a device for delivering a continuous blast of air against the edges of said sheets.

16. The combination set forth in claim 14 in which the holding down member is positioned upon the opposite side of the pile from said gripping and separating means.

17. Sheet gripping means comprising in combination, mechanism for removing sheets singly from the top of a pile which is supported on a vertically movable pile board, said mechanism including a horizontally shiftable frame, and resilient pile edge engaging fingers carried by said frame, said mechanism being adapted to move a top sheet rearwardly of the pile into contact with said fingers, for the purpose set forth.

18. The combination set forth in claim 17 in which the said fingers are mounted for vertical movement relatively to the frame, and overlie the pile board so as to be lifted when the pile board closely approaches the sheet removing mechanism.

19. Sheet feeding mechanism comprising in combination, a sheet gripping element, and mechanism for moving said element along a closed path to separate a sheet from a pile and forward the same, said mechanism moving said element downwardly toward the top sheet of the pile in a generally vertical direction and, after a sheet has been gripped, simultaneously upwardly and rearwardly to a predetermined position; then forwardly.

20. Sheet feeding mechanism comprising in combination, a sheet gripping element, and mechanism for moving said element along a closed path to separate a sheet from a pile and forward the same, said mechanism causing said element to move simultaneously upwardly and rearwardly with respect to the pile after a sheet has been gripped, then forwardly, and then rearwardly and downwardly toward a fresh sheet, the final movement of the element toward the sheet being along a substantially vertical path.

21. Sheet feeding mechanism comprising in combination, a sheet gripping element, and mechanism for actuating said sheet gripping element along a closed path to engage, separate and forward a sheet, said mechanism including a cam device which permits the gripping element to move downwardly toward the sheet in a generally vertical direction but directs said element rearwardly as it is lifted to retract the sheet gripped as it is elevated.

22. Sheet feeding mechanism comprising in combination, a sheet gripping element, and mechanism for actuating said sheet gripping element along a closed path to engage, separate and forward a sheet, said mechanism including a two-part cam device, one part thereof being stationary and the other part displaceable, the displaceable cam part functioning only when the gripping element is rising, to cause the simultaneous upward and rearward movement of said element, while permitting said element to be moved downwardly toward the sheet along a substantially vertical path.

23. Sheet feeding mechanism comprising, in combination, a sheet gripping element, a support for said gripping element which is mounted for rocking movement about a horizontal axis in a carrier member, a cam device having a movable portion, and means for swinging the carrier about a horizontal axis and raising and lowering the same, the movable portion of the cam device lying in the path of movement of the gripper support and causing the gripper to be rocked rearwardly as it moves upwardly.

24. The method of feeding sheets from a pile of sheets which comprises fluffing up the rear edges of the group of uppermost sheets, and withdrawing the uppermost sheet by means of a suction gripper movable along a closed path over the rear margin of the sheet the downward movement of the gripper being in a substantially vertical direction and the return movement thereof being simultaneously upwardly and rearwardly, then forwardly.

25. A sheet feeding device for separating and forwarding the successive top sheets from a pile, comprising a hold-down element adapted to rest upon the top of the pile at its forward edge, a single sheet gripping member adapted to operate upon the top sheet of the pile adjacent its rear edge to move the sheet rearwardly and upwardly from beneath the hold-down element and then forwardly over the element and off of the pile, means for actuating said member, said member being the sole means for gripping, separating, and forwarding the successive top sheets from the pile, and means for delivering an air blast against the edge of the pile to float the uppermost sheets to facilitate the separating, withdrawing, and forwarding function of said member.

26. A sheet feeding device for separating and forwarding the successive top sheets from a pile, comprising a sheet gripper adapted to approach and seize a top sheet, move it upwardly and rearwardly and then forwardly from the pile and comprising a generally vertically disposed lever supported by its upper end for vertical translatory movement about its point of support, a suction head pivoted to the lower end of said lever, means for first moving said lever bodily upwardly, means for tilting said suction head rearwardly to pull the attached top sheet rearwardly, and means for then swinging said lever forwardly to deliver the sheet from the pile.

27. A sheet feeding device for separating and forwarding the successive top sheets from a pile, comprising a sheet gripper adapted to approach and seize a top sheet, move it upwardly and rearwardly and then forwardly from the pile and comprising a generally vertically disposed lever supported by its upper end for vertical translatory movement and for pivotal movement about its point of support, a suction head pivoted to the lower end of said lever, means for first moving said lever bodily upwardly, camming means for tilting said suction head rearwardly during said upward movement of said lever to pull the attached top sheet rearwardly, means for then swinging said lever and its attached suction head forwardly to deliver the sheet from the pile and camming means for leveling out the suction head during said forward swinging movement.

28. A sheet feeding device for separating and forwarding the successive top sheets from a pile, comprising a sheet gripper adapted to approach and seize a top sheet, move it upwardly and rearwardly and then forwardly from the pile and comprising a generally vertically disposed lever supported by its upper end for vertical translatory movement about its point of support, a suction head pivoted to the lower end of said lever, means for first moving said lever bodily upwardly, means for tilting said suction head rearwardly to pull the attached top sheet rearwardly, and means for then swinging said lever forwardly to deliver the sheet from the pile, said gripper lever being substantially L-shaped, one arm extending downwardly and the other extending substantially horizontally from the upper end of the first named arm, the lever being supported at its elbow on a fulcrum capable of limited vertical movement, operating means connected to the end of said horizontal arm, upward movement of said operating means serving to bodily raise said lever and its fulcrum to the upper limit of the movement of the latter, said tilting means being a stationary cam surface adapted to be contacted by the suction head, during the upward movement of the lever, to tilt the head rearwardly, further upward movement of the operating means beyond the limit of movement of the fulcrum of the lever serving to swing the downwardly extending arm of the lever forwardly, the cam surface being so shaped as to cause the suction head to level out during this forward delivery movement of the gripper.

29. Sheet feeding mechanism according to claim 28 wherein the fulcrum capable of limited vertical movement is carried by a rocking lever pivotally supported in the horizontally shiftable frame, which rocking lever is provided with a stop arm for limiting its upward movement and a spring for biasing it upwardly.

30. Sheet-feeding mechanism according to claim 28, wherein the L-shaped gripper lever carries a roller which engages the horizontally disposed actuating bar on its downward movement so that the L-shaped gripper lever is moved downward and the rocking lever tilted.

31. Sheet feeding mechanism according to claim 28, wherein the suction head pivoted at the lower end of the gripper lever is provided with a roller carried at the end of a lever to engage the cam and tilt the suction head when the gripper lever is raised and moved rearwardly and then forwardly to deliver a sheet, and is provided with a spring for biasing it towards a fixed stop carried by the gripper lever when the roller is not engaging the cam.

32. Sheet feeding mechanism according to claim 28, wherein the suction head is connected by conduits in the L-shaped gripper lever and a flexible pipe from the L-shaped lever to a valve box having a control valve for regulating the suction which is periodically established and discontinued during the sheet feeding operation.

33. A sheet feeding device for separating and forwarding the successive top sheets from a pile, comprising a hold-down element adapted to rest upon the top of the pile at its forward edge, a single sheet gripping member adapted to operate upon the top sheet of the pile adjacent its rear edge to seize the sheet and to move the sheet rearwardly and upwardly free from the rear edges of the remaining sheets, to remove the forward edge of said top sheet from beneath the hold-down element, and then move the sheet forwardly over the element, and means for actuating said member.

34. A sheet feeding device for separating and forwarding the successive top sheets from a pile, comprising a hold-down element adapted to rest upon the top of the pile at its forward edge, a suction gripper member adapted to operate upon the top sheet of the pile adjacent its rear edge to move the sheet rearwardly to remove the forward edge from beneath the hold-down element, and then move the sheet forwardly over the element, and means for actuating said member, said member being the sole means for gripping, and initiating the forwarding movement of the successive top sheets of the pile.

35. A sheet feeding device for separating and forwarding the successive top sheets from a pile carried by a vertically movable pile board, said device comprising an upwardly yieldable gauge and hold-down element positioned in the path of movement of the pile of sheets mounted upon the board and adapted to rest upon the top of the pile at its forward edge as the pile is raised, said upwardly yieldable element having a shoulder formed thereon engaging the front edge of the sheets of the upper part of the pile to prevent forward displacement of the uppermost sheets of the pile, regardless of the position assumed by the element during normal operation, a single sheet gripping member adapted to operate upon the top sheet of the pile adjacent its rear edge to move the sheet rearwardly from beneath the hold-down element and away from said shoulder, and then forwardly over the element, and means for actuating said member, said member being the sole means for gripping, and initiating the forwarding movement of the successive top sheets from the pile.

36. A sheet feeding device for separating and forwarding the successive top sheets from a pile, and particularly applicable to stream feeding, said device comprising, in combination, a hold-down element adapted to rest upon the top of the pile at its forward edge, a single sheet gripping member disposed above the rearmost portion of the pile and so constructed and arranged as to positively seize the top sheet of the pile adjacent its rear edge, pull said top sheet rearwardly to remove the forward edge thereof from beneath said hold-down element, and then move said sheet forwardly over said element, and means for actuating said sheet gripping member, said member being the sole means for gripping the successive top sheets and initiating the forwarding movement of said sheets from the pile.

37. A sheet feeding device for separating and forwarding the successive top sheets from a pile, and particularly applicable to stream feeding, said device comprising, in combination, a hold-down element adapted to rest upon the top of the pile at its forward edge, a single sheet handling member disposed above the rearmost portion of the pile and provided with one or more sheet gripping portions to which said sheets will adhere, said member being so constructed and arranged as to positively seize the top sheet of the pile adjacent its rear edge, pull said top sheet rearwardly to remove the forward edge thereof from beneath said hold-down element, and then move said sheet forwardly over said element, and means for actuating said sheet handling member, said member being the sole means disposed above the pile and located within the horizontal confines thereof for separating and forwarding the successive top sheets from the pile.

DAVID P. SANFORD.